(12) United States Patent
Wey et al.

(10) Patent No.: US 9,092,162 B2
(45) Date of Patent: *Jul. 28, 2015

(54) GRAPHICAL USER INTERFACE FOR VIEWING OR EDITING AN EXECUTABLE BLOCK DIAGRAM MODEL

(75) Inventors: Claudia Wey, Wayland, MA (US); John Ciolfi, Wellesley, MA (US); Leonard Conte, Northborough, MA (US); Eric Pressman, Brookline, MA (US); Pieter J. Mosterman, Framingham, MA (US); Jay Ryan Torgerson, Hopkinton, MA (US); Murali Yeddanapudi, Watertown, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,249

(22) Filed: Sep. 12, 2011

(65) Prior Publication Data

US 2012/0005611 A1 Jan. 5, 2012

Related U.S. Application Data

(63) Continuation of application No. 11/974,740, filed on Oct. 16, 2007, now Pat. No. 8,019,579.

(51) Int. Cl.
*G06G 7/48* (2006.01)
*G06F 9/44* (2006.01)

(52) U.S. Cl.
CPC ............... *G06F 8/10* (2013.01); *G06F 9/4443* (2013.01)

(58) Field of Classification Search
CPC ..... G06F 9/4443; G06F 8/10; G06F 17/5009; G06F 17/5018; G06F 2217/16

USPC ............................................................ 703/6
See application file for complete search history.

(56) References Cited

U.S. PATENT DOCUMENTS

| 6,028,602 | A * | 2/2000 | Weidenfeller et al. ......... 715/781 |
| 6,535,890 | B2 * | 3/2003 | Sandifer ....................... 707/603 |
| 7,149,596 | B2 * | 12/2006 | Berger et al. .................. 700/98 |
| 7,519,516 | B1 | 4/2009 | Wendlandt et al. |
| 8,370,399 | B2 * | 2/2013 | Kitsis et al. .................... 707/803 |
| 2003/0093337 | A1 * | 5/2003 | Song et al. ..................... 705/27 |
| 2005/0039162 | A1 * | 2/2005 | Cifra ............................ 717/105 |
| 2006/0010111 | A1 * | 1/2006 | Jones et al. ...................... 707/3 |
| 2006/0282416 | A1 * | 12/2006 | Gross et al. ...................... 707/3 |
| 2007/0261021 | A1 * | 11/2007 | Aberg .......................... 717/105 |

(Continued)

OTHER PUBLICATIONS

SIMULINK (Model-Based and System-Based Design, Version 5, 2002).*

(Continued)

*Primary Examiner* — Kamini S Shah
*Assistant Examiner* — Andre Pierre Louis
(74) *Attorney, Agent, or Firm* — Harrity & Harrity, LLP

(57) ABSTRACT

In one embodiment, a method for displaying elements of an attribute in an executable block diagram model is provided. The method may include displaying an executable block diagram model in a first window and receiving a first input from an input device, wherein the first input associates with a first parameter of a block diagram modeling component in the executable block diagram model, the first parameter is represented in the executable block diagram model by a first graphical affordances. The method may include triggering the display of a value of a first parameter in a first user interface widget in the first window.

23 Claims, 37 Drawing Sheets

(56) References Cited

U.S. PATENT DOCUMENTS

2009/0037158 A1\* 2/2009 Shakeri et al. .................... 703/2
2014/0107814 A1\* 4/2014 Silvestro et al. ................ 700/87

OTHER PUBLICATIONS

The MathWorks, Inc., "Simulink, Model-Based and System-Based Design," Using Simulink, Version 4.1, 846 pages (2001).

\* cited by examiner

GRAPHICAL USER INTERFACE FOR VIEWING OR EDITING AN EXECUTABLE BLOCK DIAGRAM MODEL

This Application claims priority to and the benefit of U.S. patent application Ser. No. 11/974,740, titled "GRAPHICAL USER INTERFACE FOR VIEWING OR EDITING AN EXECUTABLE BLOCK DIAGRAM MODEL", which was filed on Oct. 16, 2007, now U.S. Pat. No. 8,019,579. The above-identified application is hereby incorporated by reference in its entirety as though fully set forth herein.

BACKGROUND

In an executable block diagram model, there may be multiple blocks and lines connecting the blocks. Dialog boxes are often used to view and/or edit parameters used in the executable block diagram model. Conventional configurations may require that a user switch focus between the model window and the dialog box windows for viewing and/or editing parameter values.

SUMMARY

In one embodiment, a computer readable medium holding computer executable instructions for displaying one or more attributes associated with one of one or more block diagram modeling components of an executable block diagram model may be provided. The medium may include instructions for displaying an executable block diagram model in a first window, the executable block diagram model comprising a first block diagram modeling component having a first attribute. The first block diagram modeling component may be associated with a first graphical affordance. The first block diagram modeling component may be displayed with the first graphical affordance. The first graphical affordance may be activated. The medium may further include instructions for displaying a first widget in response to activating the first graphical affordance, the first widget displaying one or more attribute values associated with the first block diagram modeling component.

Yet in another embodiment, a computer readable medium holding computer executable instructions for causing a computing device to display one or more attributes associated with one or more block diagram modeling components of an executable block diagram model, where at least one of the one or more attributes has one or more attribute values may be provided. The medium may include instructions for displaying an executable block diagram model in a first window, where the executable block diagram model comprises a first block diagram modeling component that includes a first attribute having one or more attribute values. One or more hotspot regions around the first block diagram modeling component may be identified. The identifying may include associating one of the one or more hotspot regions with the first attribute. The identifying may further include associating another of the one or more hotspot regions with a second attribute when a second attribute is associated with the first block diagram modeling component. The medium may also include instructions for receiving a first input for the first attribute or the second attribute, where the first input modifies one or more attribute values of the first attribute or the second attribute. The one or more attribute values associated with the first attribute or the one or more attribute values associated with the second attribute may be displayed via a first widget in the first window, where the displaying provides updated information about the first block diagram modeling component or the executable block diagram model.

Still in another embodiment, a computer readable medium holding computer executable instructions for searching one or more attributes associated with one or more block diagram modeling components of an executable block diagram model may be provided. The medium may hold instructions for displaying an executable block diagram model in a first window, wherein the executable block diagram model comprises one or more block diagram modeling components having one or more attributes, the one or more attributes having one or more attribute values. The medium may further hold instructions for displaying a search tool in the first window, wherein the search tool includes a category option that comprises a search category or a text field for receiving a search string, the search string relating to one or more attribute values. The attributes of the executable block diagram model may be searched to match the search category or the search string with the one or more attribute values. One or more block diagram modeling components having one or more attributes with attribute values matching to the search category or the search string may be located. The one or more located block diagram modeling components may be displayed in the first window.

In another embodiment, a computer readable medium holding computer executable instructions for viewing different layers of detail of one or more block diagram modeling components of an executable block diagram model may be provided. The medium may include instructions for displaying an executable block diagram model with one or more block diagram modeling components, the one or more block diagram modeling components having at least a normal viewing mode. The executable block diagram model may be navigated using a multi-level detail viewer. One of the one or more block diagram modeling components may be selected by positioning the multi-level detail viewer on the selected block diagram modeling component. The medium may also include instructions for displaying a first level of detail of the selected block diagram modeling component; the first level of detail illustrating one or more attributes of the selected block diagram modeling component. The one or more block diagram modeling components may be displayed in the normal viewing mode when the one or more block diagram modeling components are not selected.

In still another embodiment a system for displaying one or more attribute values of one or more attributes of a block diagram modeling component in an executable block diagram model is provided. The system may include a display device that displays an executable block diagram model having one or more block diagram modeling components in a window, wherein the one or more block diagram modeling components have one or more attributes and a model editor that associates one or more block diagram modeling components or regions around the one or more graphical components with one or more graphical affordances. The system may further include an attribute value viewer that in response to activating the one or more graphical affordances, displays a first widget for illustrating one or more attribute values of a first attribute associated with a first block diagram modeling component and an input device for entering input to modify the one or more attribute values displayed on the first widget. The system may also include an updating logic that updates the display of the block diagram with the input entered using the input device.

BRIEF DESCRIPTION OF THE FIGURES

The foregoing and other aspects, features, and advantages of the invention will become more apparent and may be better understood by referring to the following description taken in conjunction with the accompanying drawings, in which.

DETAILED DESCRIPTION

Figure 1A:
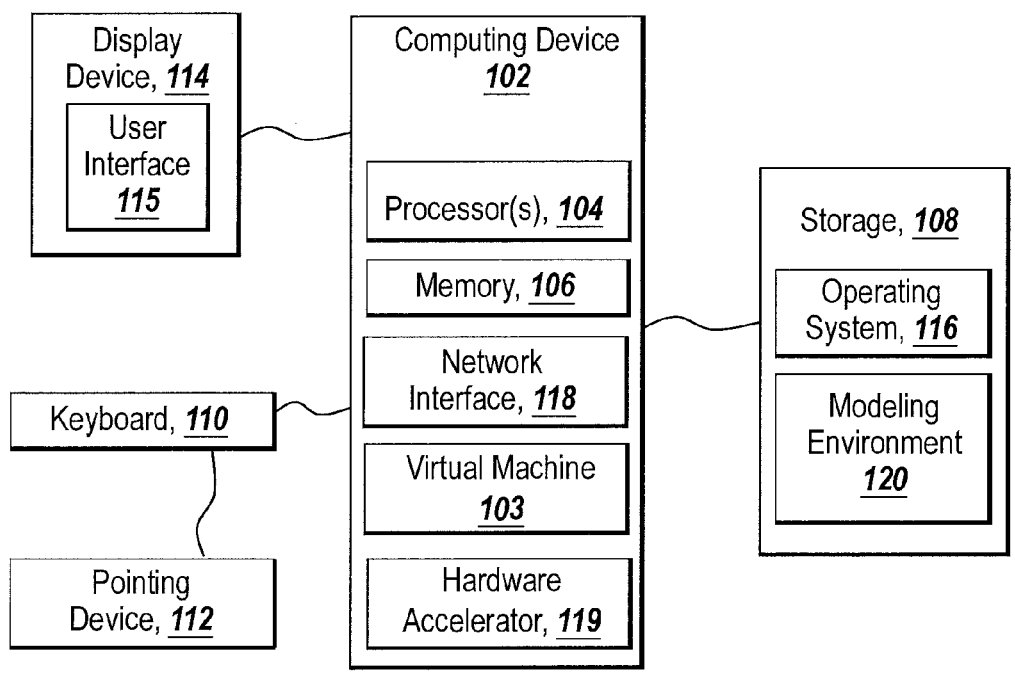
FIG. 1A is a block diagram of a computing device suitable for practicing an exemplary embodiment.

Exemplary embodiments may provide techniques, computer-based mediums, systems and/or devices for viewing and/or editing of attributes of components of an executable block diagram model. The attributes may be, but are not limited to, for example, parameters, subsystem elements, representations generated via a scripting language, or generated code. In one embodiment, a user can view and edit attributes in the same window where the executable block diagram model is displayed. Hence, a user does not need to switch between windows to view and/or edit attributes.

A dynamic system (either natural or man-made) is a system whose response at any given time is a function of its input stimuli, its current state, and the current time. Physical dynamic systems include, for example, a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

An executable block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. Those skilled in the art will recognize that the term "blocks" does not refer exclusively to elemental dynamic systems but may also include other modeling elements that aid in readability and modularity of block diagrams.

In an embodiment, the user interface widgets can be used to display the attributes. These widgets can be repositioned by a user request (e.g., such as a drag and drop function performed by the user). In another embodiment, the user interface widgets may be moved to another window or to the desktop. In one embodiment, a user can determine if a user interface widget, such as a tooltip, should be persistently visible in the executable block diagram model, and the user can also determine the layout of the user interface widget with respect to the executable block diagram model. Some embodiments may also provide techniques and/or devices for searching for a specific parameter type and value in the executable block diagram model.

Other embodiments may provide techniques, computer-readable mediums, systems, and/or devices for providing a multi-level detail viewer for displaying different levels of detail for a block diagram modeling component. For example, different levels of detail may be displayed as a user browses/navigates in an executable block diagram model. In one embodiment, different types of block diagram modeling components may have different levels of detail. In one embodiment, the specified level of detail may be displayed directly on top of the corresponding block diagram modeling component. In another embodiment, the specified level of detail may be displayed in another window that is embedded in the model window. The model window displays the executable block diagram model. In one embodiment, a property/setting displayed in the specified level of detail may be modified.

FIG. 1A depicts components suitable for practicing exemplary embodiments. The computing device 102 may be any computer device and/or system, such as a workstation, desktop computer, server, laptop, handheld computer or other form of computing or telecommunications device that is capable of communication with another device/system and that has sufficient processor power and/or memory to perform the operations described herein.

The computing device 102 can be running substantially any operating system such as a version of the Microsoft® Windows® operating systems, Unix operating system, Linux operating systems, MacOS® operating system, etc. Implementations of computing device 102 may further operate an embedded operating system, a real-time operating system, an open source operating system, a proprietary operating system, an operating system for mobile computing devices, and/or another type of operating system capable of running on computing device 102 and/or performing operations described herein.

Other computing resources, such as Field Programming Gate Array (FPGA), Application Specific Integrated Circuit (ASIC), Application Specific Instruction Processor (ASIP), Digital Signal Processor (DSP), graphics processing unit (GPU), and General Purpose Processor (GPP), may also be used for executing code and/or software. A hardware accelerator 119, such as implemented in an ASIC, FPGA, or the like, can additionally be used to increase a processing rate of the computing device 102.

Computing device 102 includes memory 106, on which software according to one embodiment of the present invention may be stored, processor(s) 104 for executing software stored in the memory 106, and other programs for controlling system hardware.

The memory 106 may include among other things a computer system memory or random access memory (RAM), such as dynamic random access memory (DRAM), static random access memory (SRAM), Magnetoresistive Random Access Memory (MRAM), extended data out random access memory (EDO RAM), etc. A user may interact with the computing device 102 through a keyboard 110, a pointing device 112, and/or a visual display device 114 such as a computer monitor, which may include a user interface 115. The user interface 115 enables the user to interact with the modeling environment 120 through the computing device 102. The user may send an input to manipulate an element of the modeling environment 120 using the user interface 115. The user interface 115 may also display the effects of the user input. Other input devices, such as accelerometer and gyroscope based input devices, active whiteboards, cameras, microphones, neuro interface devices, may also be used with computing device 102.

The computing device 102 may further include a storage device 108, such as a hard-drive, compact disc-read-only memory (CD-ROM), or other computer readable medium, for storing an operating system 116 and other related software, and for storing the modeling environment 120. Additionally, the operating system 116 and modeling environment 120 may be run from a computer readable media, such as, for example, KNOPPIX®, a bootable CD for GNU/Linux.

Figure 1B:
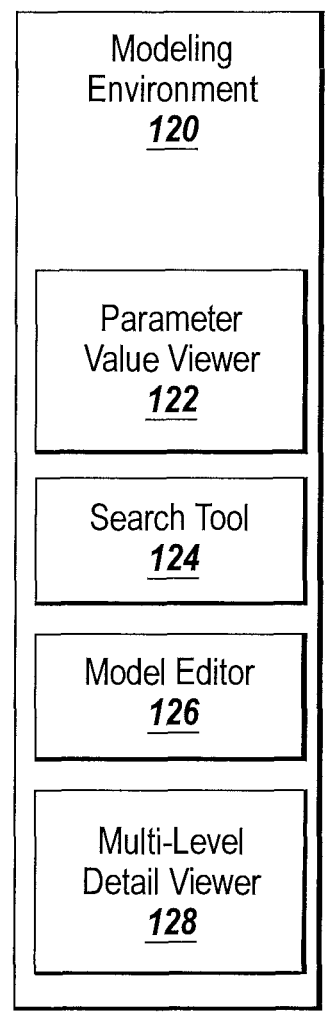
FIG. 1B is a block diagram of a modeling environment suitable for practicing an exemplary embodiment.

FIG. 1B depicts the modeling environment 120 that includes a model editor 126 for creating and/or editing an executable block diagram model. In one embodiment, modeling environment 120 may include a parameter value viewer 122 for viewing and optionally editing parameter values in an executable block diagram model. In one embodiment, the parameters may be associated with a block diagram modeling component or a portion of an executable block diagram model (e.g., a subsystem). Alternatively, the parameters may be global parameters that do not associate with any particular block diagram modeling component, but with the executable block diagram model as a whole. Modeling environment 120 may also include search tool 124 for searching a specific parameter with a specific value.

In one embodiment, model editor 126 provides graphical user interface widgets to display parameter values. The graphical user interface widgets may be repositioned in the executable block diagram model, or moved to a different window, or moved to a desktop. In one embodiment specific to Microsoft® Windows®, graphical user interface widgets may be placed on the desktop using the Active Desktop interface provided by the Microsoft® Windows® Shell Application Programming Interface (API). In another embodiment, graphical user interface widgets may be moved from a first window to a second window using dynamic data exchange or the Component Object Model (COM) interface. For example, the dynamic data exchange technique allows different Windows® applications to share data or send commands to one another.

In another embodiment, a multi-level detail viewer 128 may be provided in modeling environment 120 so that different levels of detail of a block diagram modeling component may be displayed. In one embodiment, one or more details of a block diagram modeling component are categorized into a certain level of detail. For different types of block diagram modeling components, different types of level of detail and different quantities of level of detail may be provided. For example, in one embodiment, modeling environment 120 may have a set of predetermined levels of detail for a block diagram modeling component. Modeling environment 120 may display relevant information for a selected level of detail for the corresponding block diagram modeling component based on a selected level of detail.

Parameter value viewer 122, search tool 124, and multi-level detail viewer 128 can be adapted to be included as part of the modeling environment 120, or they can each be a stand-alone application, module, script, plug-in, or program that responds to calls from the modeling environment 120.

Additionally, the computing device 102 may include a network interface 118 to interface to a Local Area Network (LAN), Wide Area Network (WAN) or the Internet through a variety of connection types including, but not limited to, standard telephone lines, LAN or WAN links (e.g., 802.11, 802.16, T1, T3, 56 kb, X.25), broadband connections (e.g., Integrated Services Digital Network (ISDN), Frame Relay, asynchronous transfer mode (ATM)), wireless connections, etc., or some combination of any or all of the above.

The network interface 118 may include a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing the computing device 102 to any type of network capable of communication and performing operations described herein.

Virtualization can be employed in computing device 102 so that infrastructure and/or resources in computing device 102 can be shared. Virtualized processors may also be used with modeling environment 120 and/or other software in storage 108. A software referred as a virtual machine may be used to create a virtualized environment between the computing device 102 and the infrastructure and/or resources of the computing device 102. A virtual machine 103 can be provided to handle a process running on multiple processors so that the process appears to be using only one computing resource rather than multiple computing resources. Multiple virtual machines can also be used with one processor.

Figure 2A:
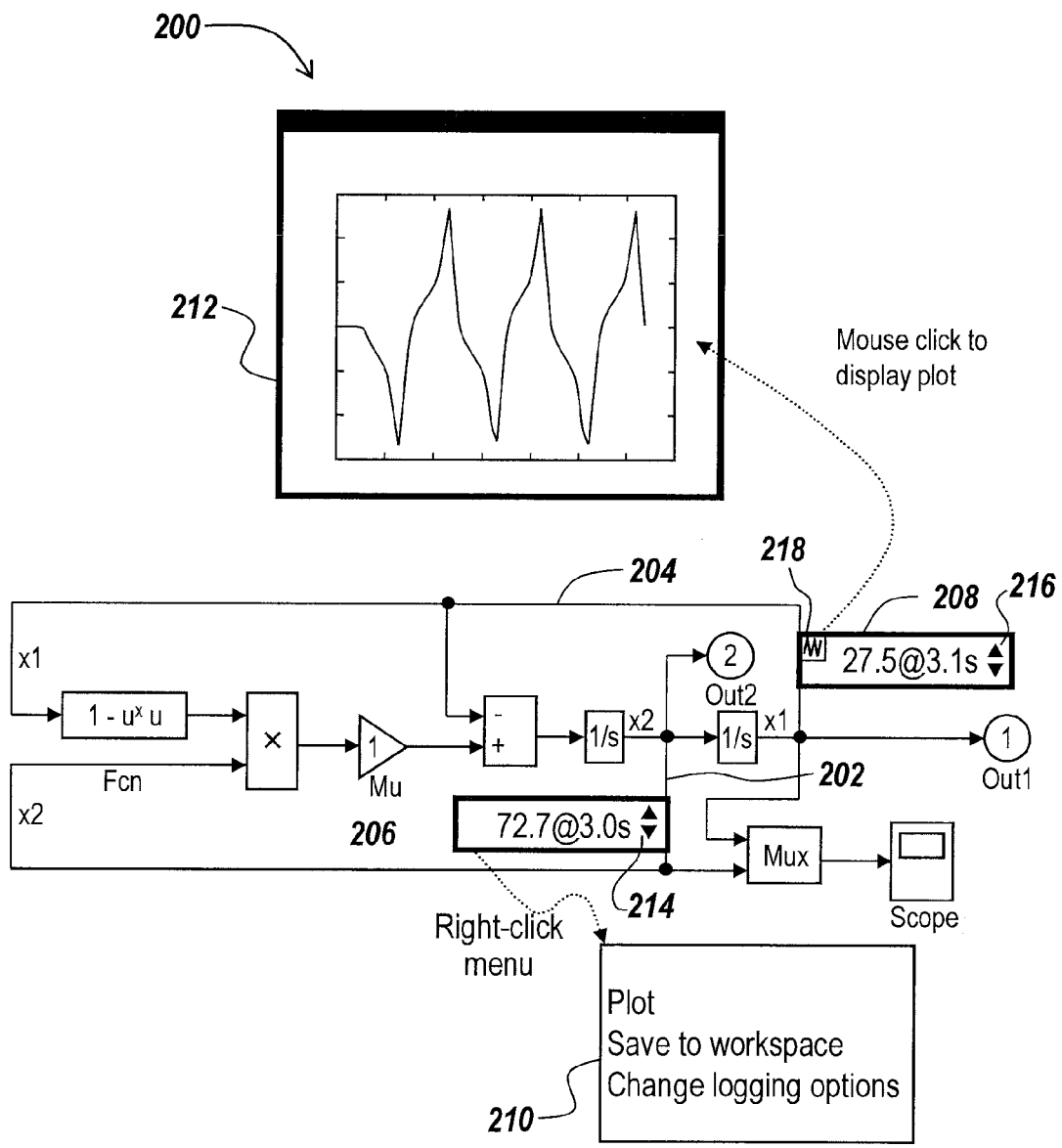
FIG. 2A illustrates an exemplary user interface widget that displays values of a signal parameter of an exemplary model.

FIG. 2A illustrates use of an exemplary user interface widget for viewing values of a signal parameter in an exemplary model. Executable block diagram model 200 is an exemplary model that can be implemented using a modeling environment. Other models that can be used with exemplary techniques described herein can be implemented in other types of modeling environments. In one embodiment, executable block diagram model 200 may be an executable model includes multiple blocks and/or signals. A user can choose to view values of signal 202 by selecting the signal 202. A selection can be made, for example, by clicking on the signal 202 or hovering over the signal 202 with a cursor.

A signal, as used herein, represents a set of values. For example, a signal may be a set of values that can be stored, read from storage, manipulated, sent from a source to a destination, etc. For example, a signal may be associated with a path (e.g., a connection line) in an executable block diagram model. The path may indicate a source location for the signal and a destination for the signal. In one implementation, the signal may be read from the source location and stored at the destination. In another implementation, the signal may propagate from the source location to the destination along the path. Signals that can be used with exemplary embodiments may take on different values as a model executes. Signals may have attributes, such as dimensionality, data type, sample rate, etc.

When signal 202 is selected, a user interface widget 206, such as a tooltip or balloon help, appears and displays information about the signal parameter values of signal 202. For example, signal 202 may be a graphical affordance that acts as a control that may trigger the display of widget 206. A widget is an interface element that a computer user interacts with, such as a window, a text box, or the like. A graphical affordance is used to indicate to the user that when activated, the graphical affordance will result in an action. The graphical affordance indicates an ability to control or trigger an action. Widget 206 displays signal parameter values at a given time during the simulation of the executable block diagram model 200. Scroll bar 214 is provided to allow a user to scroll through the history of signal parameter values for signal 202. The scroll bar 214 helps the user to see the information that does not fit in the display area of the widget 206. The scroll bar 214 may take other forms such as a slider, a dial or the like. User interface widget 208 displays signal parameter values for signal 204. Widgets 206 and 208 may be resized at a user's request, such as, for example, by dragging and dropping the borders of the widget.

Signal 204 is a graphical affordance that acts as a control that may trigger the display of widget 208. Widget 208 may also include scroll bar 216 for viewing different signal parameter values at different simulation times. Both widgets 206 and 208 are embedded in the model window so that a user does not need to switch windows to view signal parameter values. Exemplary implementations allow a user to view parameter values in the same window as the model.

Widgets 206 and 208 may utilize references or pointers to memory 106 or storage 108 where the values of signals are stored so that widgets 206 and 208 can reflect any changes in the respective signal values. Alternatively, modeling environment 120 may supply the signal values for widgets 206 and 208 for display. The positioning, size, elements, and display time of the widgets 206 and 208 may be controlled by the modeling environment 120. Modeling environment 120 may also provide options for a user to customize the positioning, size, elements, and display time of the widgets 206 and 208.

The parameter value viewer 122 may provide menus (e.g., right-click menus) for some or all of the widgets 206-208. For example, widget 206 can have a right-click menu 210 that allows a user the option to plot signal values in a figure, to save the value signals to a workspace or to change logging options.

Parameter value viewer 122 can also allow widgets to have icons other than a scroll bar 214. For example, widget 208 can have a plot icon 218. When a user clicks on the plot icon 218, a window appears to display a plot 212 of the signal parameter values. Plot 212 may be drawn by feeding signal values and their corresponding time data into a plot function in a programming software. The plot 212 may be a dynamic plot reflecting simulation data of the signal 204 as the simulation progresses. In another example, a connection icon may be provided in widget 208 to connect signal 204 to a scope block in a modeling environment for a user to view how the signal value changes as a function of time.

Furthermore, an option can be provided, such as via a button, to allow signal values of signal 204 to be exported or saved into a workspace so that a user can manipulate the signal data as desired in the corresponding programming environment. Widgets 206 and 208 may include additional information, such as the name of the corresponding signal, the source of the signal, the destination of the signal, etc. Widgets 206 and 208 may also include less information than what is illustrated in FIG. 2A. Widgets 206 and 208 may include any type of text, graphics, or hyperlinks to display or manipulate information related to corresponding graphical affordances (i.e. signals 202 and 204 respectively in this case).

Figure 2B:
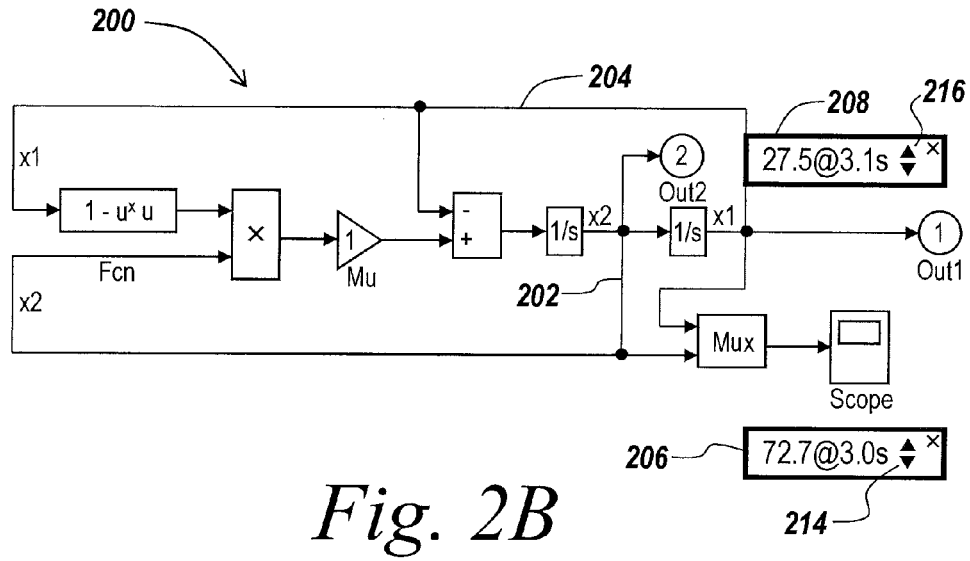
FIG. 2B illustrates how the user interface widget can be repositioned in the exemplary model in FIG. 2A.

FIG. 2B illustrates how a widget can be repositioned in the model 200. In this example, the widget 206 is repositioned relative to its position in FIG. 2A. Once a widget appears in the executable block diagram model 200, a user can move the widget around in the executable block diagram model 200. For example, widget 206 can be moved away from signal 202 and to a side of the executable block diagram model 200. In one embodiment of the present invention, widget 206 can have an "x" at the upper right hand corner of the widget, so that a user can determine when the widget should no longer be present in the model 200 by selecting the "x" with a pointing device. In one embodiment, a widget may maintain a relative position to its corresponding block diagram modeling component, such as a signal, so that the widget moves corresponding with the movement of the corresponding graphical model component.

Figure 2C:
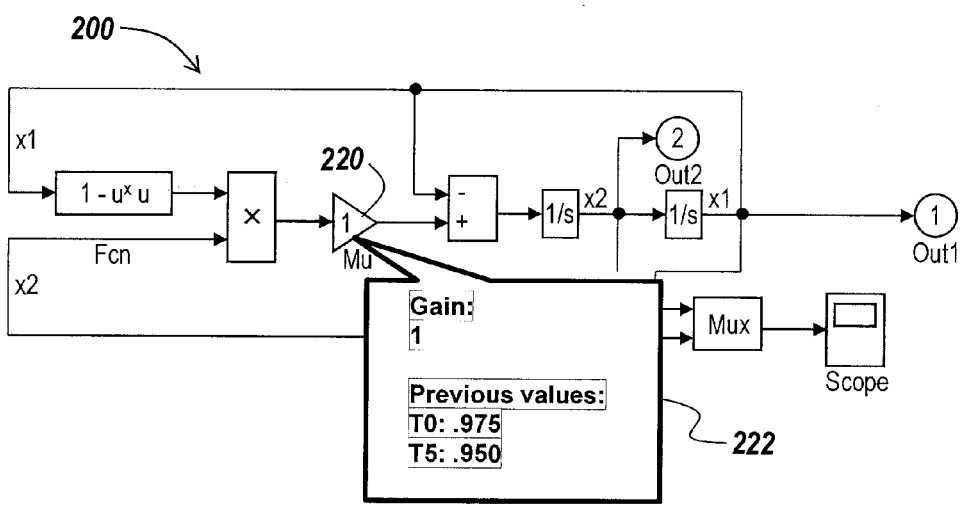
FIG. 2C illustrates an exemplary user interface widget that displays a history of values of a block parameter.

FIG. 2C illustrates another exemplary user interface widget that can be used to view a history of values of a block parameter. When a user selects block 220, a user interface widget 222 can appear and show the name of the block with its current value 1 at time T7 and previous values 0.975 at time T0 and 0.950 at time T5. The widget 222 may display dynamic data. In the dynamic state, the widget 222 may display the block's value at time T10 while the previous values will show the values at time T0, T5 and T7. An "x" may also be provided at the upper right hand corner of the widget 222 so that a user can make the widget 222 disappear when desired. One of ordinary skill in the art will appreciate that the present invention is not limited to the specific GUI widgets illustrated or mentioned herein and any suitable GUI widget may be used in the present invention for displaying signal values and/or block parameters.

Figure 3A:
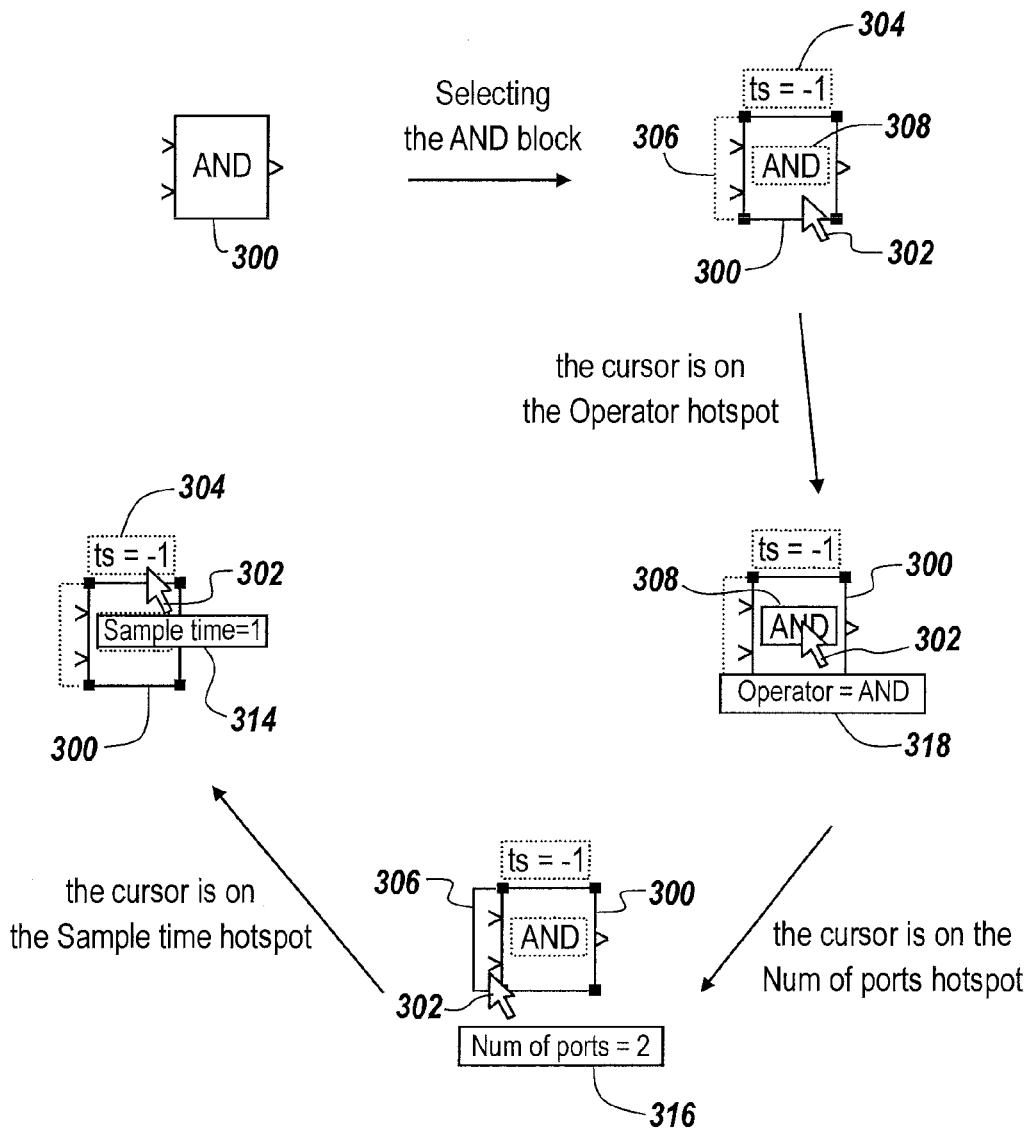
FIG. 3A illustrates exemplary user interface widgets that display block parameters and their values.

FIG. 3A illustrates how block parameters and their values can be displayed in an exemplary embodiment. Block 300 can be used as a part of a model, and when block 300 is not selected, no parameter for the block is displayed. Block 300 can be selected by placing an arrow cursor 302 over block 300 and hovering for a predetermined period of time or by clicking on the block 300 with a pointing device.

Once block 300 is selected, one or more hotspots may be displayed in the model window. As used herein, a screen hotspot (hotspot) is referred to as a region of a block diagram modeling component, an icon, a pop-up display or other graphical affordances. A hotspot may be represented without using a special icon to indicate its location. The hotspot may be visually distinct or a user action may reveal the hotspot, for example by changing the shape of the arrow cursor. Block 300 has hotspot 304, hotspot 306, and hotspot 308. In one embodiment, all hotspots are displayed when block 300 is selected. In another embodiment, only certain hotspots are displayed. In still another embodiment, broken lines (e.g., dashed, dotted, etc.) may be used to illustrate the location and/or region of the hotspot, or different shades or color may also be used to illustrate the location and/or region of the hotspot. One of ordinary skill in the art will appreciate that there are many different ways to graphically represent a hotspot.

In an exemplary embodiment, a hotspot may act as a control that triggers the display of an associated user interface widget. For example, when arrow cursor 302 is navigated into a hotspot, a user interface widget, such as a tooltip, can appear and may display the associated parameter name and/or value. In one embodiment, when arrow cursor 302 is navigated over a hotspot, the border of the hotspot area may change appearance, such as becoming a solid red line, to provide feedback to the user that the arrow cursor 302 has entered a region that can activate the hotspot. Alternatively, the solid red line may appear when the arrow cursor 302 moves within the block outline or other regions that has a relation to the hotspot. As the arrow cursor 302 hovers over the hotspot area, the hovering may trigger the display of the corresponding GUI widget, such as a tooltip. The user interface widget may disappear once the arrow cursor 302 moves away from the hotspot and moves out a region of the hotspot that triggers the display of the user interface widget.

When arrow cursor 302 is navigated to the hotspot 308, user interface widget 318 may be displayed to show the parameter name as "Operator" and parameter value as "AND". When the arrow cursor 302 is on the hotspot 306, user interface widget 316 indicates the name of the associated parameter is "Num of ports" and the value of the associated parameter is "2". As the arrow cursor 302 moves into hotspot 304, a user interface widget 314 appears and displays the associated parameter name "Sample time" and value "−1".

In one embodiment, a user can view parameter values as he/she navigates through an executable block diagram model. The user interface widget appears in the same window as the executable block diagram model. The parameter value is displayed on a separate window, such as a dialog box window. In one embodiment, each hotspot has a 1 to 1 relationship with the associated parameter or can alternatively be associated with a set of parameters.

Figure 3B:
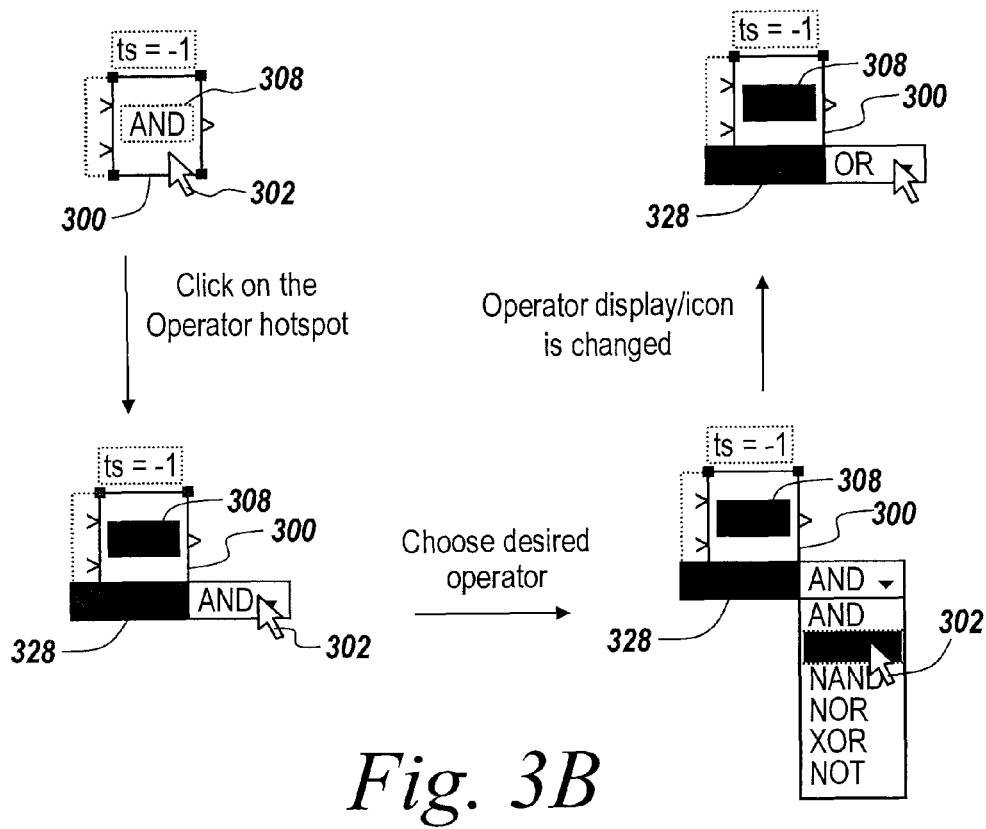
FIG. 3B illustrates how a value of a block parameter can be modified using a pointing device in an exemplary embodiment.

FIG. 3B illustrates how a value of a block parameter can be modified using a pointing device. In order to modify a parameter of a block, the block is selected. Once the block is selected, the hotspot that corresponds to the parameter that a user wishes to edit is then selected. In the case of FIG. 3B, hotspot 308 is selected. Hotspot 308 can be selected, for example, by single-clicking on the hotspot 308. One of ordinary skill in the art will appreciate that other implementations of selection can also be used to practice the present invention.

When hotspot 308 is selected, a user interface widget 328 appears to show the associated parameter name and value. User interface widget 328 may provide a drop-down list for changing the associated parameter value. A user can use a pointing device to move the cursor 302 to activate the drop-down list and choose a new value from the options provided in the drop-down list. In FIG. 3B, a new value of "OR" is selected and the drop-down list returns to its inactive state and the appearance of the user interface widget 308 is updated to reflect the change (i.e. showing "OR" instead of "AND").

A user interface widget can include any type or number of graphical user interface elements that can allow a user to modify a parameter value. Although a drop-down list is shown in FIG. 3B as the user interface element for a user to edit a parameter value, one of ordinary skill in the art will appreciate that the present invention is not limited to a specific kind of graphical user interface widget to edit a parameter value.

Figure 3C:
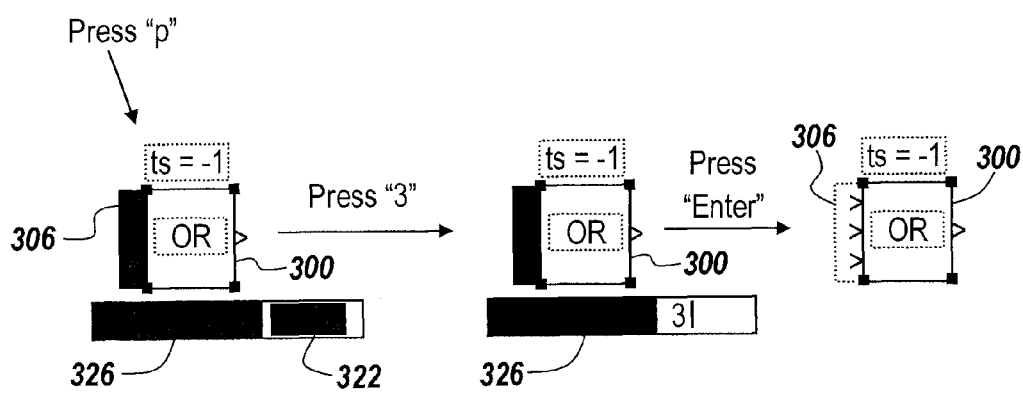
FIG. 3C illustrates how a value of a block parameter can be modified using a keyboard in an exemplary embodiment.

FIG. 3C illustrates how a value of a block parameter can be modified using a keyboard. As mentioned earlier, a letter from the parameter name may be used as a hotkey that is associated with the parameter. A hotkey refers to a single key or a sequence and/or combination of keys that are used to associate with a parameter of a selected block diagram modeling component. Pressing parameter hotkeys when the block is selected will highlight and start the editing of the related parameter and/or hotspots.

Referring back to FIG. 3A, user interface widget 314 shows that keystroke "t" is the hotkey associated with the sample time parameter by being shown in bold. Widget 316 shows that key "p" is the hotkey associated with the number of ports parameter, whereas widget 318 shows that "O" is the hotkey associated with the operator parameter. In a case insensitive implementation, a single key "o" can be the hotkey associated with the operator parameter, while in a case sensitive implementation, key "SHIFT+o" or other methods of producing an upper case "O" can be used as the hotkey.

In one embodiment, the letter or symbol representing the hotkey can be recognized in the displayed parameter name in the widget so that a user does not need to look up or search for a hotkey that is related to a parameter of a selected block diagram modeling component. In FIGS. 3A to 3C, the letter representing the hotkey has a bold font. In another embodiment, the letter(s) and/or symbol(s) representing the hotkey can have a different font, a different color, underlined, highlighted, a different background color, etc. There are many ways to make the letter(s) and/or symbol(s) that represents the hotkey recognizable in the displayed parameter name or the component icon and the present invention is not limited to the exemplary embodiments.

Referring back to FIG. 3C, once a block diagram modeling component is selected, pressing a hotkey may display the corresponding user interface widget that displays the name and value of the associated parameter. In FIG. 3C, key "p" is pressed to initiate editing of the parameter value field in widget 326. A vertical line cursor 322 is automatically presented in the text field in widget 326. One of ordinary skill in the art will appreciate that the specific cursors used in the illustrative embodiments are not meant to limit the scope of the present invention and other cursors may also be used with the present invention. Alternatively, the text field may be displayed without a visual appearance such as a cursor. The user may edit the parameter by simply entering the new parameter in the text field provided in proximity of the widget 326.

After pressing the key "p", the value of the parameter number of ports is changed to 3 by pressing key "3". By pressing "Enter" key on a keyboard, the parameter value is updated and the appearance of hotspot 306 is updated (to show there are three ports instead of two). In other words, once block 300 is selected, a user can press "p," "3," and "Enter" keys in sequence to change a parameter value and the change may be reflected in the appearance of the hotspot. In one embodiment, users can view and/or modify parameter values in an executable block diagram model quickly with the use of hotkeys.

Figure 3D:
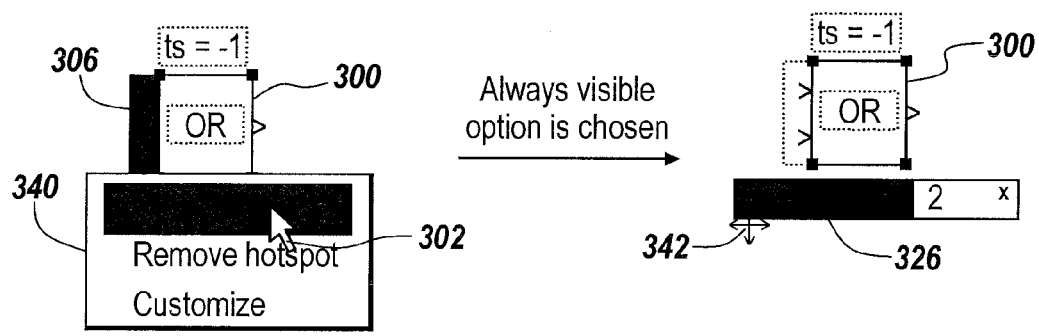
FIG. 3D illustrates how a block parameter value can be made selectively visible and how the user interface widget showing the parameter value can be repositioned in an exemplary embodiment.

FIG. 3D illustrates how a block parameter value can be made selectively visible and how the user interface widget showing the parameter value can be repositioned in one exemplary embodiment. In one embodiment, if a parameter is not made selectively visible, then the widget displaying the parameter name and value disappears as the cursor 302 moves out a region that activates the display of the widget associated with the parameter. In another embodiment, if a parameter is not made selectively visible, the widget displaying the parameter name and value may disappear as the cursor 302 moves into a region that deactivates the display of the widget associated with the parameter. In a further embodiment, the regions that activate and deactivate the display of the parameter name and value may be different.

Parameter value viewer 122 can provide a right-click menu to the widget that displays the parameter and its value to allow a user to have the option of making the widget selectively visible and hence displaying the parameter name and value at all times until the users indicates otherwise. In FIG. 3D, hotspot 306 has a right-click menu 340 showing three options: always visible, remove hotspot, and customize. In one embodiment, by activating the always visible option, widget 326 is selectively displayed in the model window. An "x" may be provided at the upper right-hand corner of widget 326 once widget 326 is selectively displayed so that a user can choose to make widget 326 disappear by selecting the "x" with a pointing device. In another embodiment, a user may make widget 326 disappear to deselect the always visible option in the right-click menu 340.

Once widget 326 is selectively displayed, widget 326 may be moved to other locations in the window displaying the executable block diagram model. In another embodiment, widget 326 may be moved to other windows or dialogs associated with the executable block diagram model. In still another embodiment, widget 326 may be moved to the desktop or a window of another application. By placing the cursor 302 over widget 326, repositioning icon 342 is displayed that allows a pointing device to drag or move widget 326 to other locations within the executable block diagram model. In another embodiment, when repositioning icon 342 appears, a widget may be copy/cut from one location and pasted into another location. In one embodiment, widget 326 maintains a relative position with respect to the belonging block, in this case, block 300.

Figure 3E:
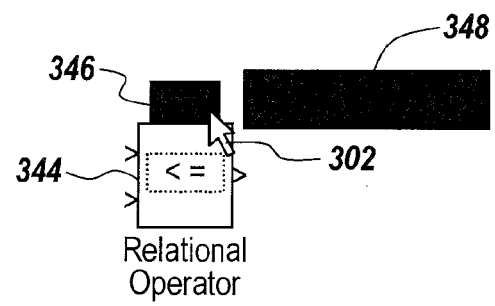
FIG. 3E illustrates an exemplary user interface widget that may be used to display a property of a block diagram modeling component.

FIG. 3E illustrates how a block parameter and its value can be depicted using an exemplary user interface widget other than text fields or combo boxes. Block 344 has a hotspot 346. When block 344 is selected, cursor 302 may move into a region of hotspot 346 to trigger display of widget 348. Widget 348 shows that a check box is used to indicate if a zero crossing option is used in the algorithm for block 344.

Figure 3F:
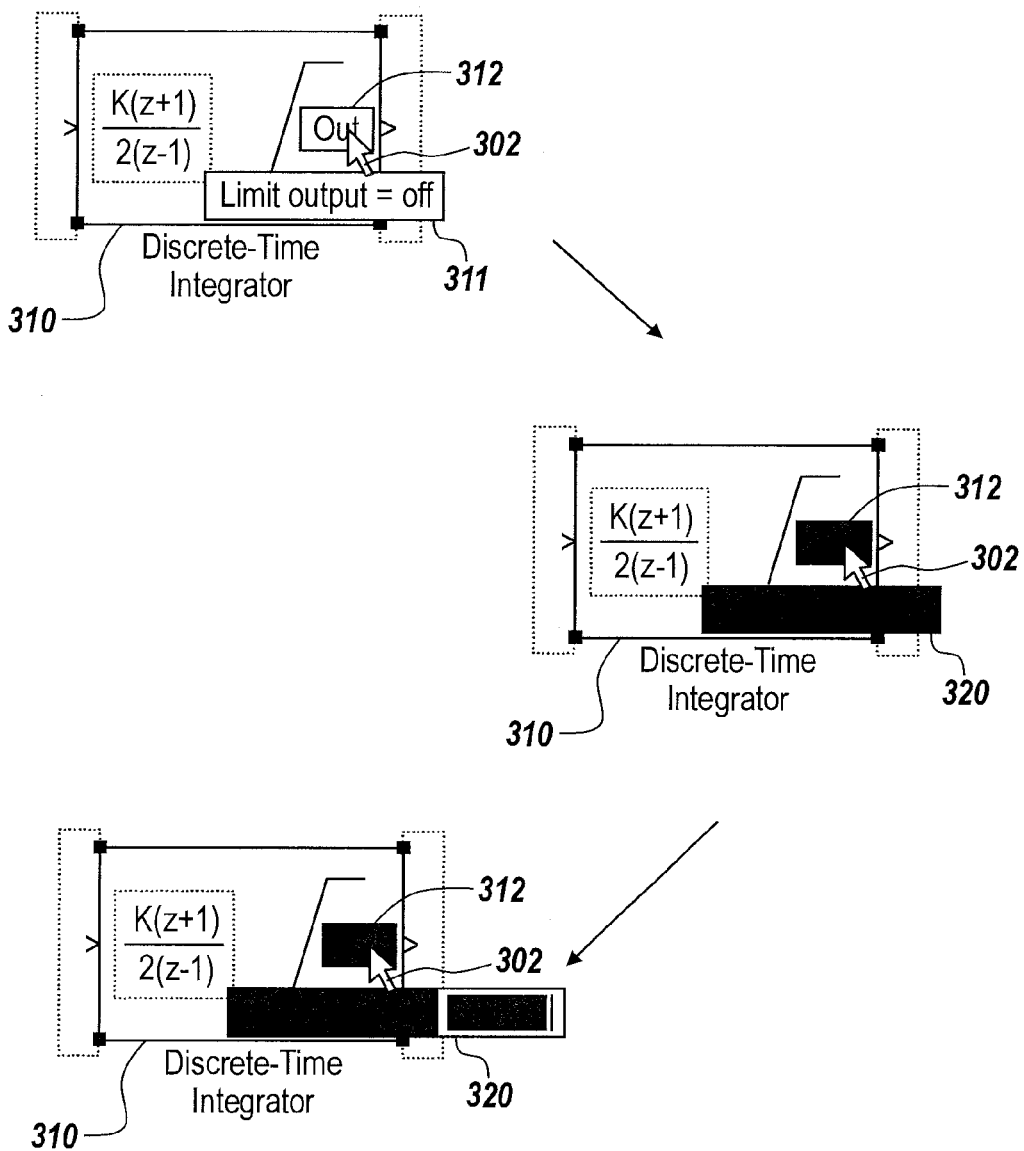
FIG. 3F illustrates how different user interface widgets may be used with a block diagram modeling component in an exemplary embodiment.

FIG. 3F illustrates an exemplary embodiment where multiple user interface widgets are associated with one hotspot, and these widgets are used to change a property of a block. Block 310 has a hotspot 312. When a cursor 302 hovers over hotspot 312, widget 311 is displayed showing that a property "limit output" of block 310 is off. When hotspot 312 is selected, widget 311 becomes editable and displays a check box option for a user to decide if the property "limit output" should be enabled for block 310. If the check box in widget 311 is selected, a text field 324 can appear to let a user specify the limits of the output.

In one embodiment, the upper limit and the lower limit shown in the text field 324 may be changed by mouse movement, such as increasing a value of the upper limit or the lower limit by moving the scroll wheel of a mouse. In another embodiment, an input device, such as a stylus, may be used to draw a number that is adopted as the new parameter value.

Figure 3G:
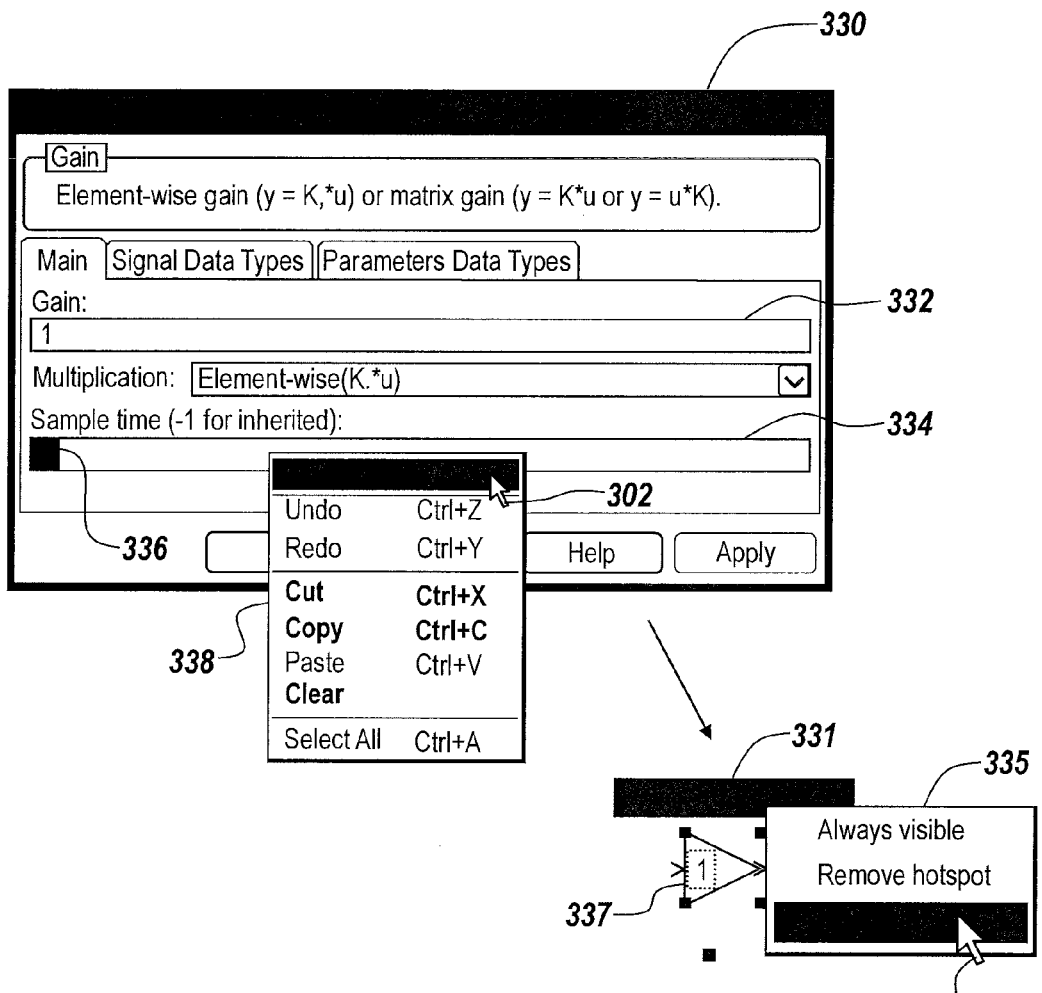
FIG. 3G illustrates how a hotspot can be created and how the hotspot can be customized in one exemplary embodiment.

FIG. 3G illustrates how a hotspot can be created in one exemplary embodiment. Dialog window 330 (a separate window from the model window) shows the parameters of gain block 337, including "gain" parameter with a value of "1" as shown in text field 332, "multiplication" parameter with a value of "Element-wise(K.*u)" in drop-down list 334, and "sample time" parameter with a value of "−1" in the text field 336. To add a hotspot, a user can use the right-click menu of a parameter in the dialog window 330 and choose the option "Add as hotspot". In the illustrative example, hotspot 331 is added to gain block 337 using the right click menu 338 of the sample time parameter. Hence, FIG. 3G shows that a user can choose what parameters/properties of a block diagram modeling component, such as a block, to expose as hotspots.

FIG. 3G further illustrates how a hotspot can be customized in one exemplary embodiment. FIG. 3G shows that hotspot 331 has a right click menu widget 335 that provides a user with options to remove the hotspot 331, make the hotspot 331 always visible, or customize the hotspot 331. A user may customize the look of hotspot 331 by choosing the customize option in the right click menu widget 335 of the hotspot 331. A user can also customize or choose a hotkey for the hotspot using the customize option. Instead of a right click menu to provide a user the option to customize a hotspot, other means, such as one or more keystrokes, can be used to give the user the option to customize a hotspot.

Figure 3H:
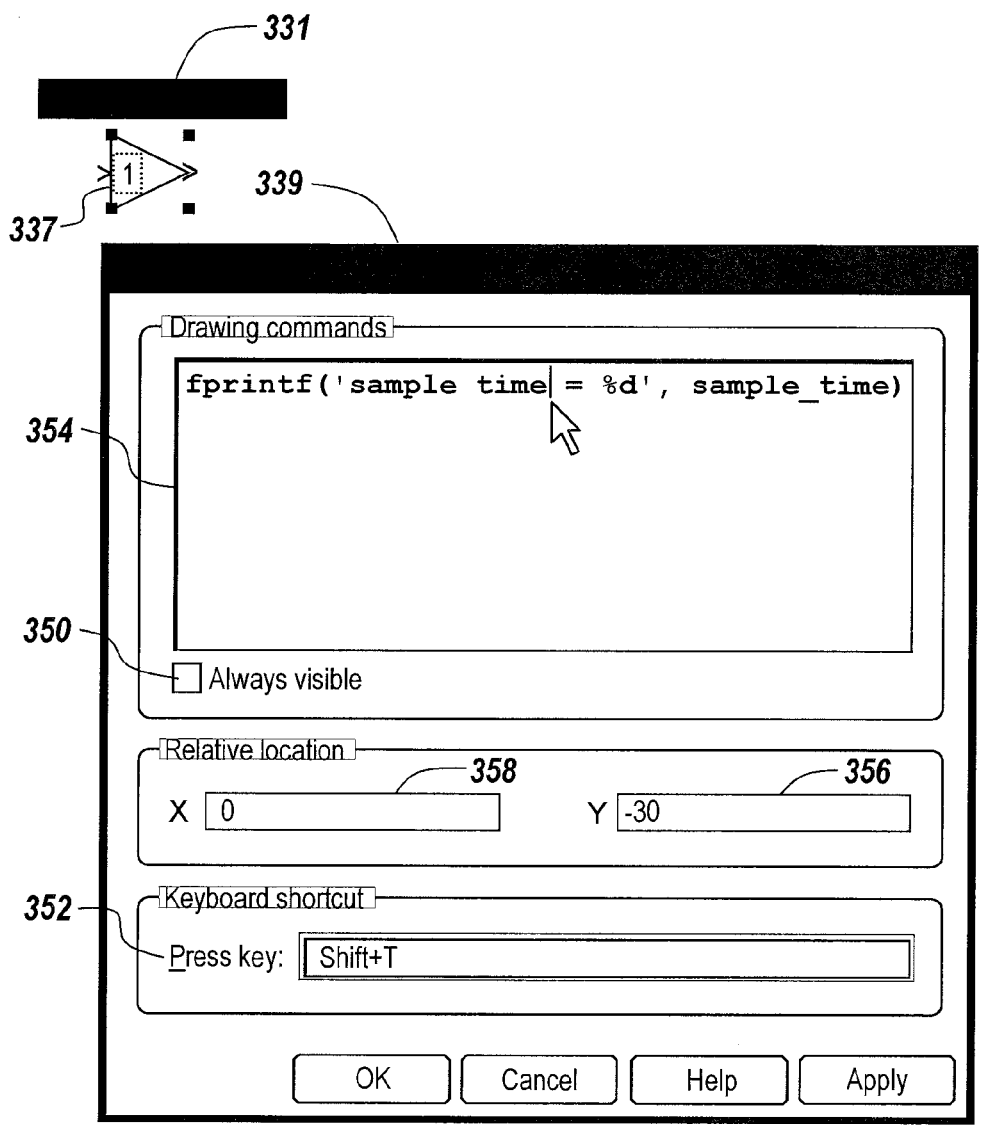
FIG. 3H illustrates an exemplary user interface that may be used to change an appearance and position of a hotspot.

FIG. 3H illustrates an exemplary user interface that may be used to change the appearance and position of a hotspot. FIG. 3H shows that block 337 has a hotspot 331 that displays "sample time=−1" and has a rectangular shape. A graphical user interface 339 may appear for a user to customize a hotspot 331 when a user selects a customization option related to the hotspot 331, such as right-clicking with a mouse on hotspot 331 to get a right click menu 335 as shown in FIG. 3G.

In one embodiment, graphical user interface 339 may be a dialog box that is displayed in a separate window from the model window. In another embodiment, graphical user interface 339 may be displayed in the same model window. Graphical user interface 339 includes a text field 354 for entering drawing commands for hotspot 331. Text field 354 has a MATLAB command that outputs "sample time=" and the value of a variable with the name "sample_time". The MATLAB command determines the text that is displayed in hotspot 331.

Graphical user interface 339 may include a check box 350 that allows a user to select if hotspot 331 should be always visible. Graphical user interface 339 further includes a relative x position text field 358 and a relative y position text field 356 for customizing a relative location (in pixels) of the hotspot 331 with respect to its belonging block, i.e. block 337. The relative x position text field 358 shows a value of 0 while the relative y position text field shows a value of −30. It is noted that FIGS. 3H-3K are not drawn to scale. Graphical user interface 339 includes a field 352 for customizing a keyboard shortcut, i.e. a hotkey, for selecting hotspot 331 from a keyboard when block 337 is selected. Field 352 may include one or more key strokes to be used as a hotkey.

Figure 3I:
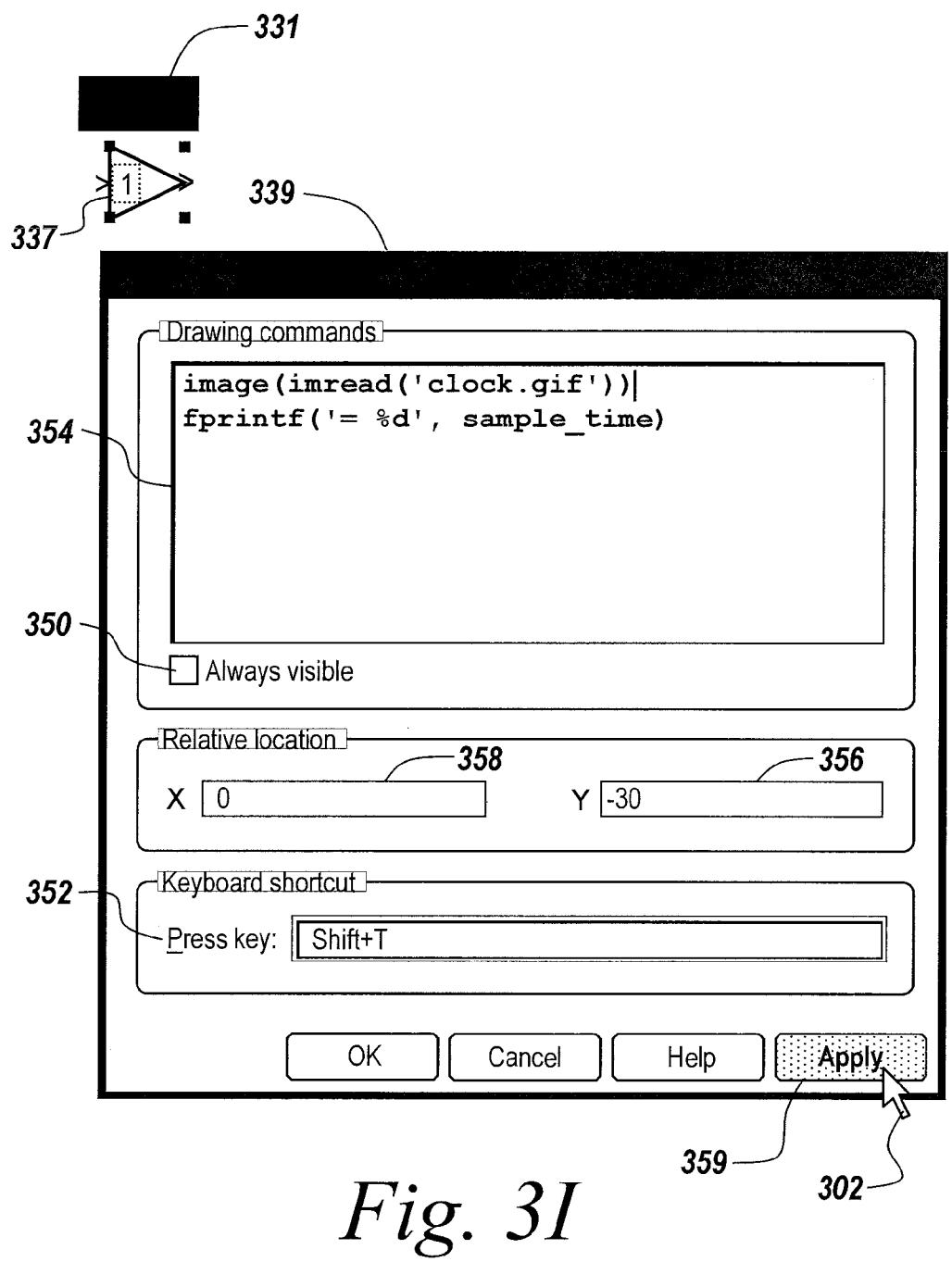
FIG. 3I illustrates the use of an image to customize the appearance of a hotspot in one exemplary embodiment.

FIG. 3I illustrates the use of an image to customize the appearance of a hotspot in one exemplary embodiment. In text field 354, a user can enter a command to use an image to customize an appearance of a hotspot. An image file with the name of "clock.gif" is used to customize the appearance of hotspot 331. Instead of using a command to output "sample time=" and the value of the sample_time variable, a command is used to output "=" and the value of the sample_time variable. When apply button 359 is selected by a pointing device, the appearance of hotspot 331 is updated according to the new drawing commands in text field 354.

Figure 3J:
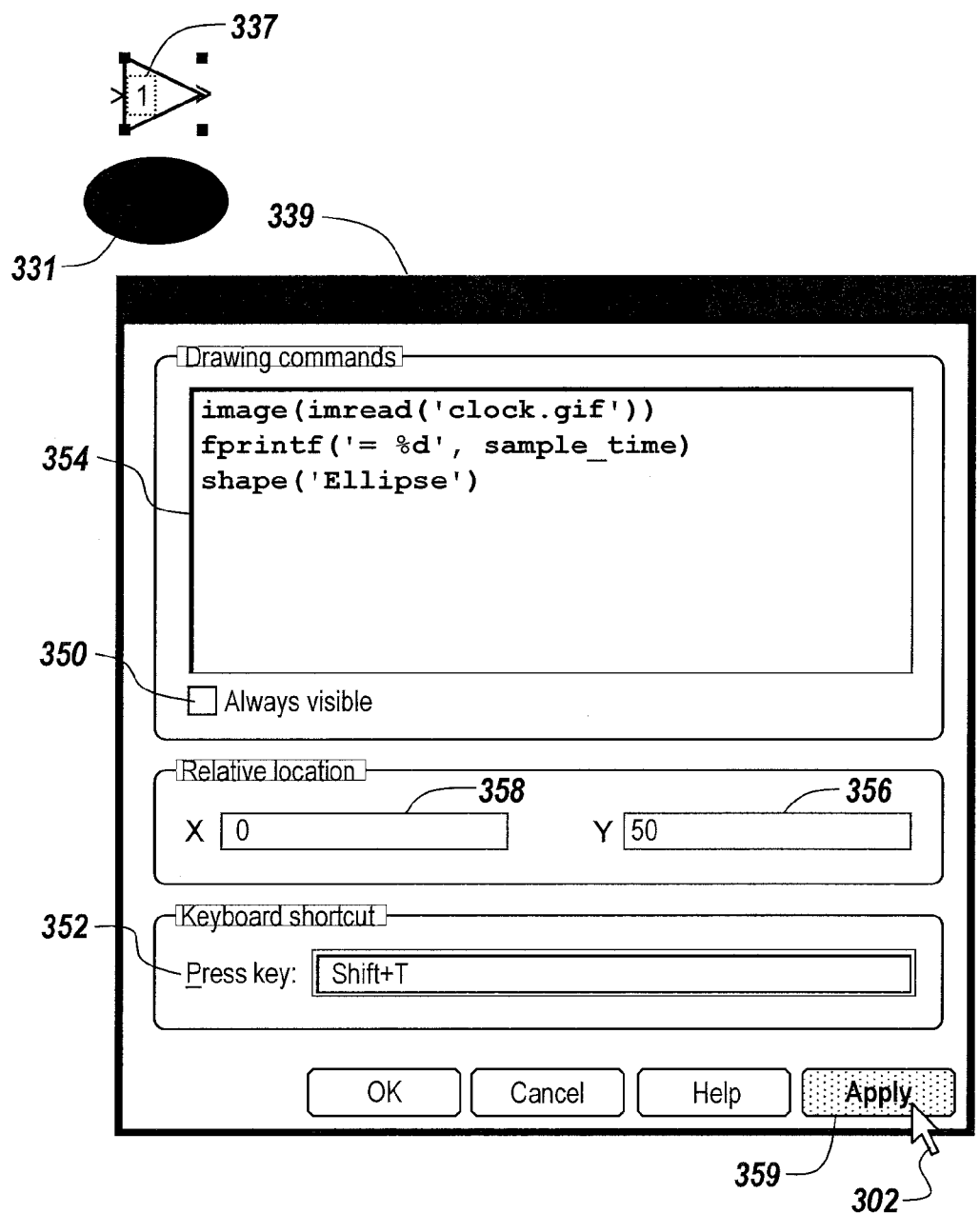
FIG. 3J illustrates how the shape and position of the hotspot may be customized in one exemplary embodiment.

FIG. 3J illustrates how the shape and position of the hotspot may be customized in one exemplary embodiment. Besides the drawing commands shown in FIG. 3I, FIG. 3J further includes a shape command that sets the shape of hotspot 331 to an ellipse in the text field 354. The shape command changes the shape of the hotspot from a rectangular shape to an elliptical shape. The relative-y position field 356 is changed from its previous value of −30 to 50. Once the apply button 359 is selected, the shape and position of the hotspot is updated. Hotspot 331 is now displayed below block 337 instead of above. Hotspot 331 also has an elliptical shape instead of rectangular shape.

Figure 3K:
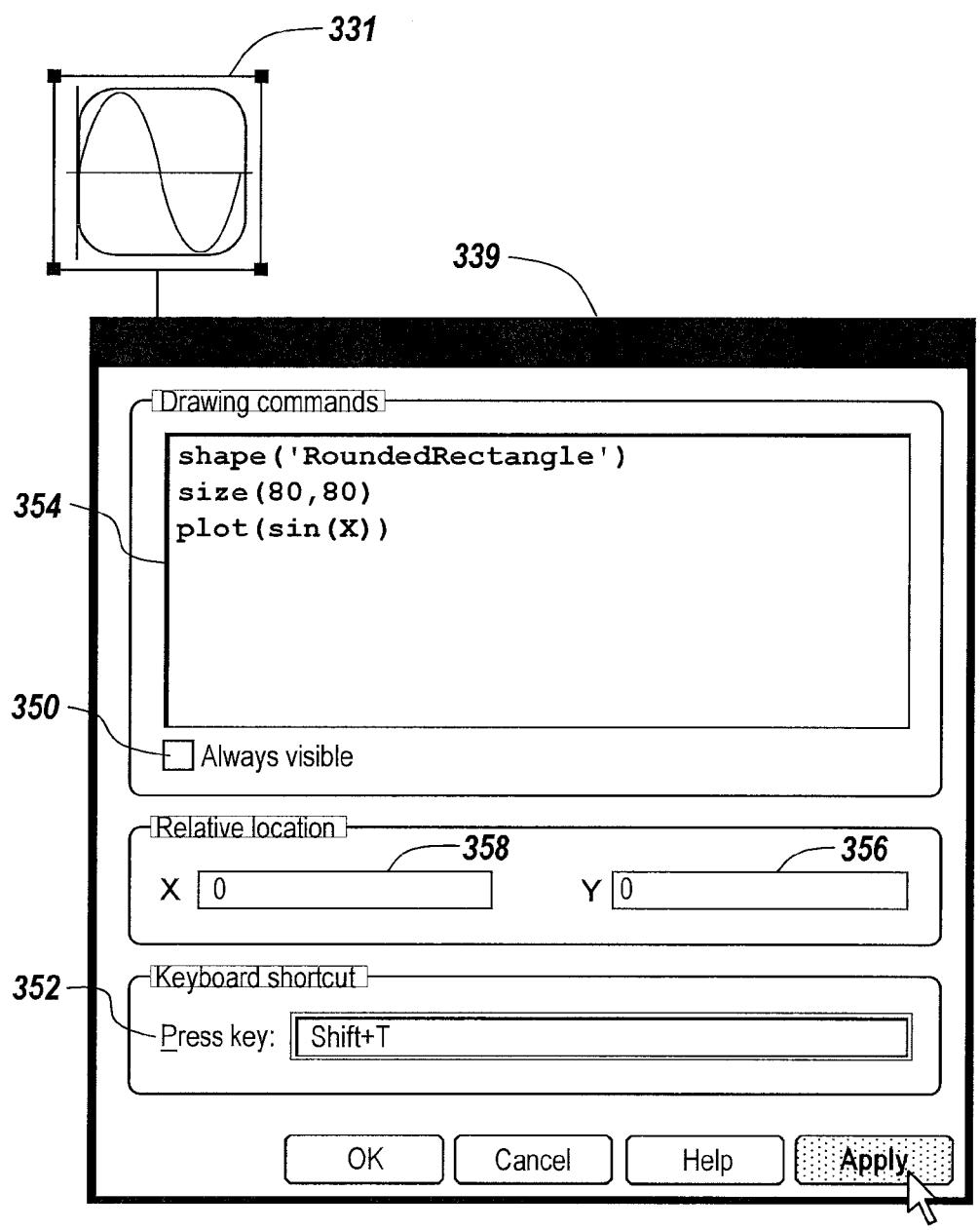
FIG. 3K illustrates how a plot of a function can be used as the appearance of a hotspot in one exemplary embodiment.

FIG. 3K illustrates how a plot of a function can be used as the appearance of a hotspot in one exemplary embodiment. To change an appearance of the hotspot, one or more commands are used in the text field 354. To plot a function, a MATLAB plot command may be used. In FIG. 3K, text field 354 shows that a function of sin(x) is used as an input to a MATLAB plot command. Text field 354 further includes a shape command that specifies the shape of the hotspot to be a rounded rectangle. Text field 354 also includes a size command that specifies the size of the hotspot to be 80 pixels wide and 80 pixels high. Both the relative x position text field 358 and the relative y position text field 356 has a value of 0, which yields that the center of the hotspot 331 is the same as the center of its belonging block, i.e. block 337. In one embodiment, when a hotspot and its belonging block overlaps, the hotspot is displayed instead of the belonging block for the overlapping portion.

The present invention is not limited to the specific GUI widgets illustrated or mentioned herein and any suitable GUI widget may be used in the present invention for displaying and editing parameter values.

Figure 4A:
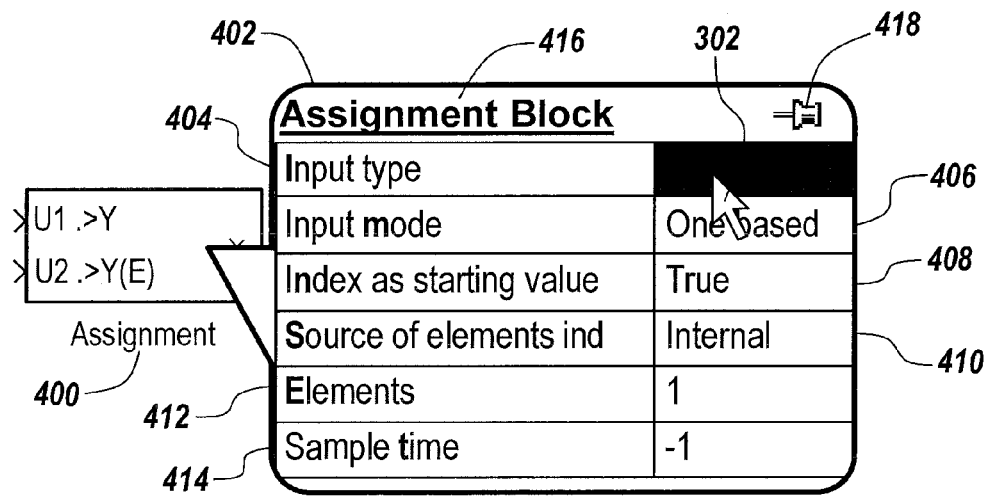
FIG. 4A illustrates the use of an exemplary editable pop-up table to display block parameter values and the use of a drop-down box to edit a block parameter value.
Figure 4B:
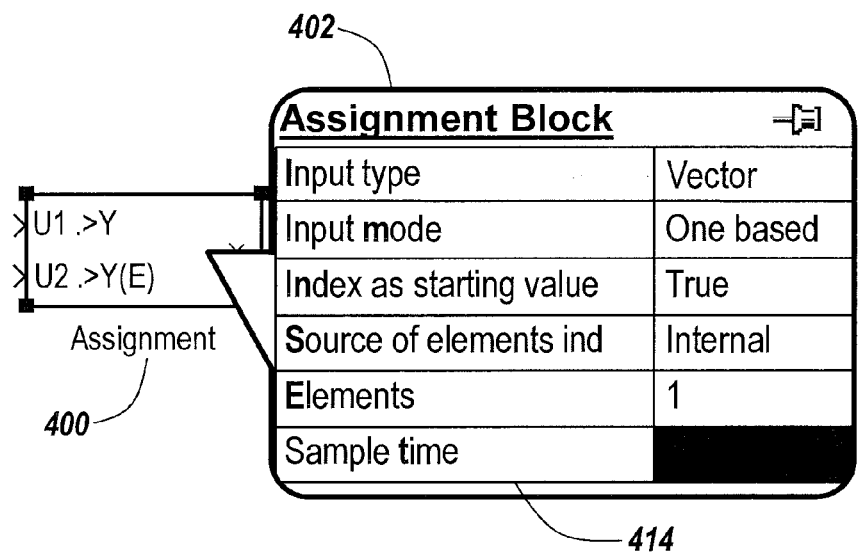
FIG. 4B illustrates the use of a text field in the exemplary editable pop-up table in FIG. 4A to edit a block parameter value.

FIGS. 4A and 4B illustrate the use of an editable pop-up table to view and edit block parameter values. When block 400 is selected, a widget 402 appears and displays a list of parameters and their values. In FIGS. 4A and 4B, widget 402 is shown as an editable pop-up table. Widget 402 is a user interface widget associated with the same model window and no separate window is needed to edit a parameter value. In an illustrative embodiment, widget 402 disappears if cursor 302 moves away from a region of block 400 that activates the display of a widget 402.

Widget 402 may have a pin button 418 that provides an always visible option that a user may select. Widget 402 may have a hyperlinked title 416 that may provide a hyperlink to the documentation for block 400. Widget 402 shows in entry 404 an "input type" parameter with "vector" as its value. Entry 406 shows "input mode" parameter with the value being "one based." Entry 408 shows that parameter "index as starting value" has the value "true." Entry 410 indicates that the parameter "source of elements index" is set to "Internal." Widget 402 also has entry 412 showing parameter "elements" having value "1" and entry 414 showing parameter "sample time" having value of "−1." Each parameter in the widget 402 may have an associated hotkey that is illustrated by the bolded letter corresponding to the hotkey in the parameter name. Hence, instead of using a pointing device, keystrokes can be used to select an entry in the widget 402 to start the editing of the associated parameter value.

FIG. 4A shows that entry 404 includes a drop-down list for a user to choose possible values for the parameter "input type." FIG. 4B shows that entry 414 includes a text field for a user to enter a value for the parameter "sample time." Any graphical user interface elements, such as, a radio button, a combo box, a text field, a check box, can be used in an editable pop-up table, and the present invention is not limited to the examples listed herein.

Figure 4C:
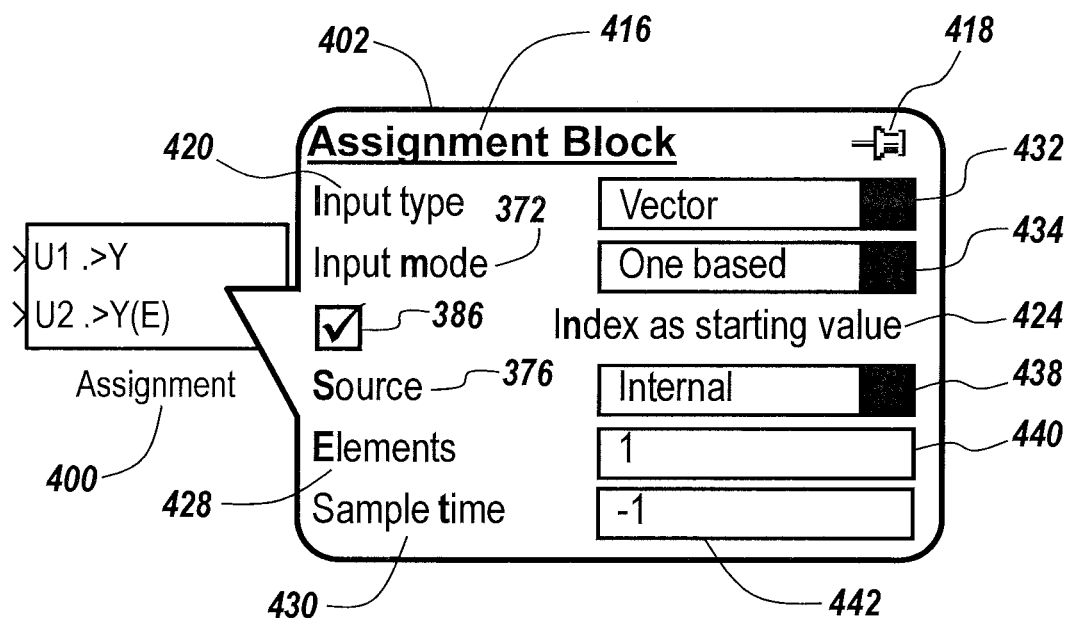
FIG. 4C illustrates the use of an exemplary user interface that does not use a table to display block parameter values in one exemplary embodiment.

FIG. 4C illustrates the use of an exemplary user interface that does not use a table to display block parameter values in one exemplary embodiment. Widget 402 is shown as a pop-up that is not a table but still displays various parameters of block 400. Widget 402 may include hyperlink title 416 that may link to a documentation of block 400. A pin button 418 may be provided as an always visible option that a user may select.

Widget 402 further includes input type parameter 420, input mode parameter 372, index as starting value parameter 424, source parameter 376, elements parameter 428, and sample time parameter 430. Input type parameter 420 has a combo box 432 that allows a user to select a desired parameter value. Input mode parameter 372 and source parameter 376 have respectively combo box 434 and combo box 438 for selecting a desired parameter value. Index as starting value parameter 424 has a check box 386 for selecting or deselecting the option of using index as starting value parameter 424. Elements parameter 428 and sample time parameter 430 have respectively text field 440 and text field 442 for a user to enter a desired parameter value.

Figure 5A:
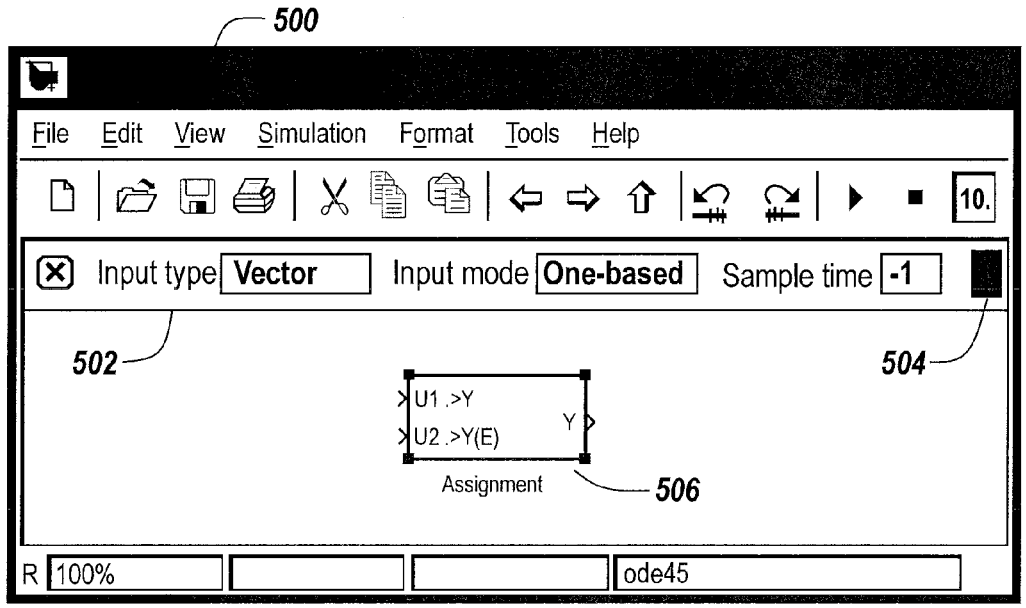
FIG. 5A illustrates a bar that allows viewing and editing of block parameter values in an exemplary graphical user interface.

FIG. 5A illustrates a bar as the user interface widget that allows viewing and editing of block parameter values. In another embodiment, a bar 502 can be provided to view and edit parameter values when block 506 is selected. Bar 502 can be displayed anywhere in the window 500. Bar 502 shows "input type" parameter with "vector" as its value. Bar 502 also shows "input mode" parameter with value as "one-base" and "sample time" parameter with value as "−1." Button 504 may be provided at an end of bar 502 to allow viewing of additional parameters and their values. To make bar 502 disappear, a user can select the "X" at one end of the bar 502. There are many different kinds of user interface widgets that can be used to view and/or edit parameter values in the same model window so that no separate window, such as a dialog window, needs to be used.

Figure 5B:
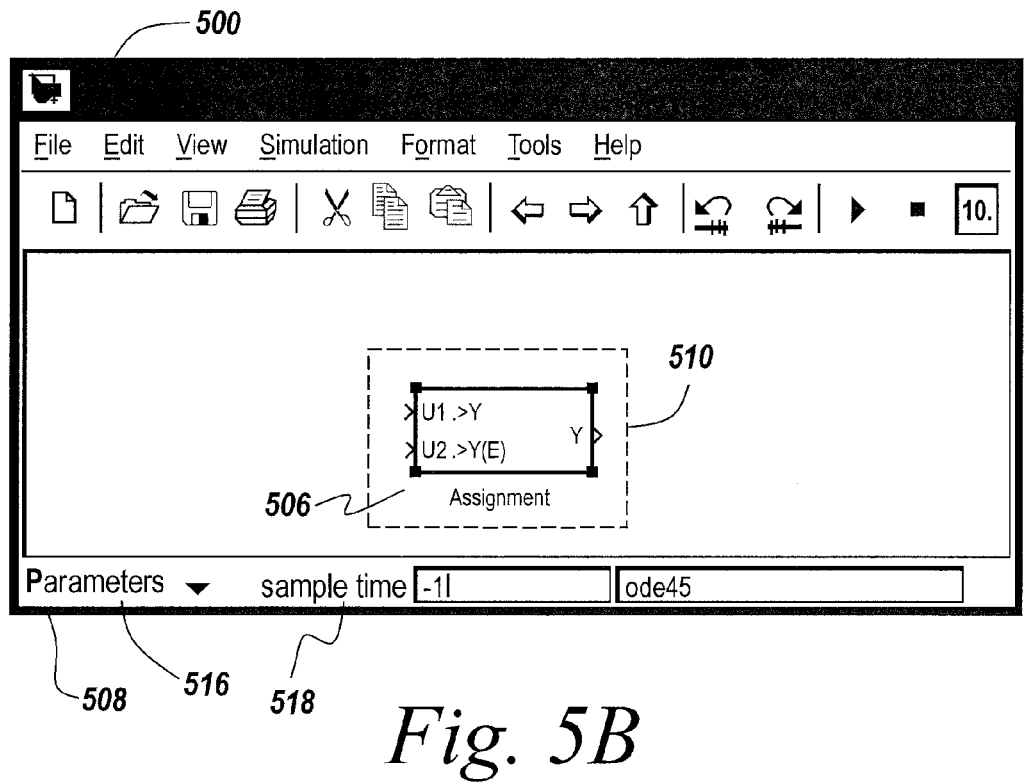
FIG. 5B illustrates a search bar for searching for a parameter with a specific value in an exemplary graphical user interface.

FIG. 5B illustrates a search bar for locating a parameter having a specific value. In one embodiment, a search tool may be provided in the status bar 508 of the window 500. Alternatively, the search tool may be provided in a tool bar or other windows related widgets. The search tool can provide search category option 516 for choosing a search category, such as configuration preferences, block names, or parameters. Each category may be associated with a hotkey. For example, configuration preferences may be associated with hotkey "c," whereas block names and parameters are associated with hotkey "n" and "p," respectively. Hence, instead of using a pointing device to choose a search category, a hotkey may be used.

Figure 5C:
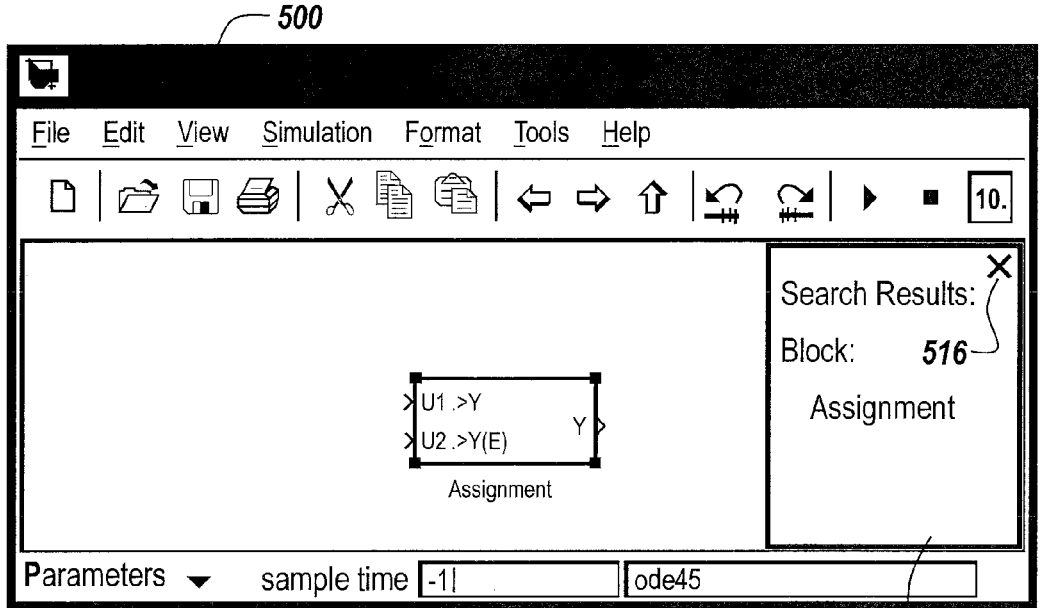
FIG. 5C illustrates an exemplary output of a search result in one exemplary embodiment.

The search tool may provide a text field 518 for a user to enter a name and/or a value of a configuration preference, block, a search category, or a parameter. Search results can be highlighted, such as by using a box 510, to show the block diagram modeling component(s) that matches the search results. FIG. 5C illustrates an alternative method for displaying search results.

Figure 5D:
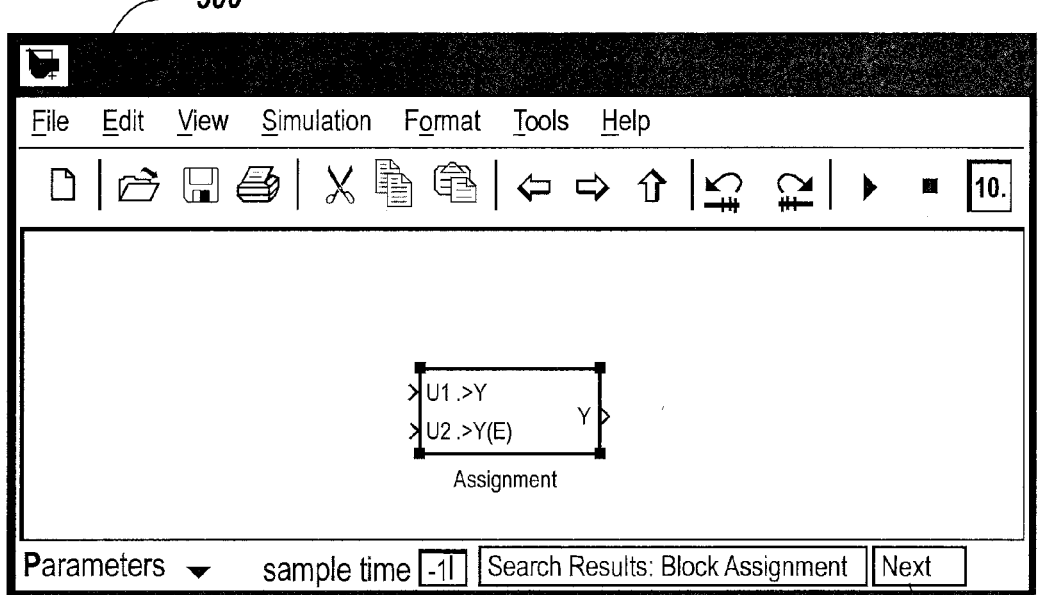
FIG. 5D illustrates an exemplary output of a search result in the status bar in one exemplary embodiment.

FIG. 5C shows that a panel or user interface widget 512 is used to list search results. Widget 512 may have an "x" sign element 516 that is activatable to make widget 512 disappear. FIG. 5D illustrates yet another method for displaying search results by having search results displayed in the status panel 508 of window 500. A next button 514 may be provided to view an additional result, for example one that does not fit in the status bar 508. One of ordinary skill in the art will appreciate that the present invention is not limited to the specific GUI widgets illustrated or mentioned herein and any suitable GUI widget may be used in the present invention for displaying and editing parameter values.

Figure 6A:
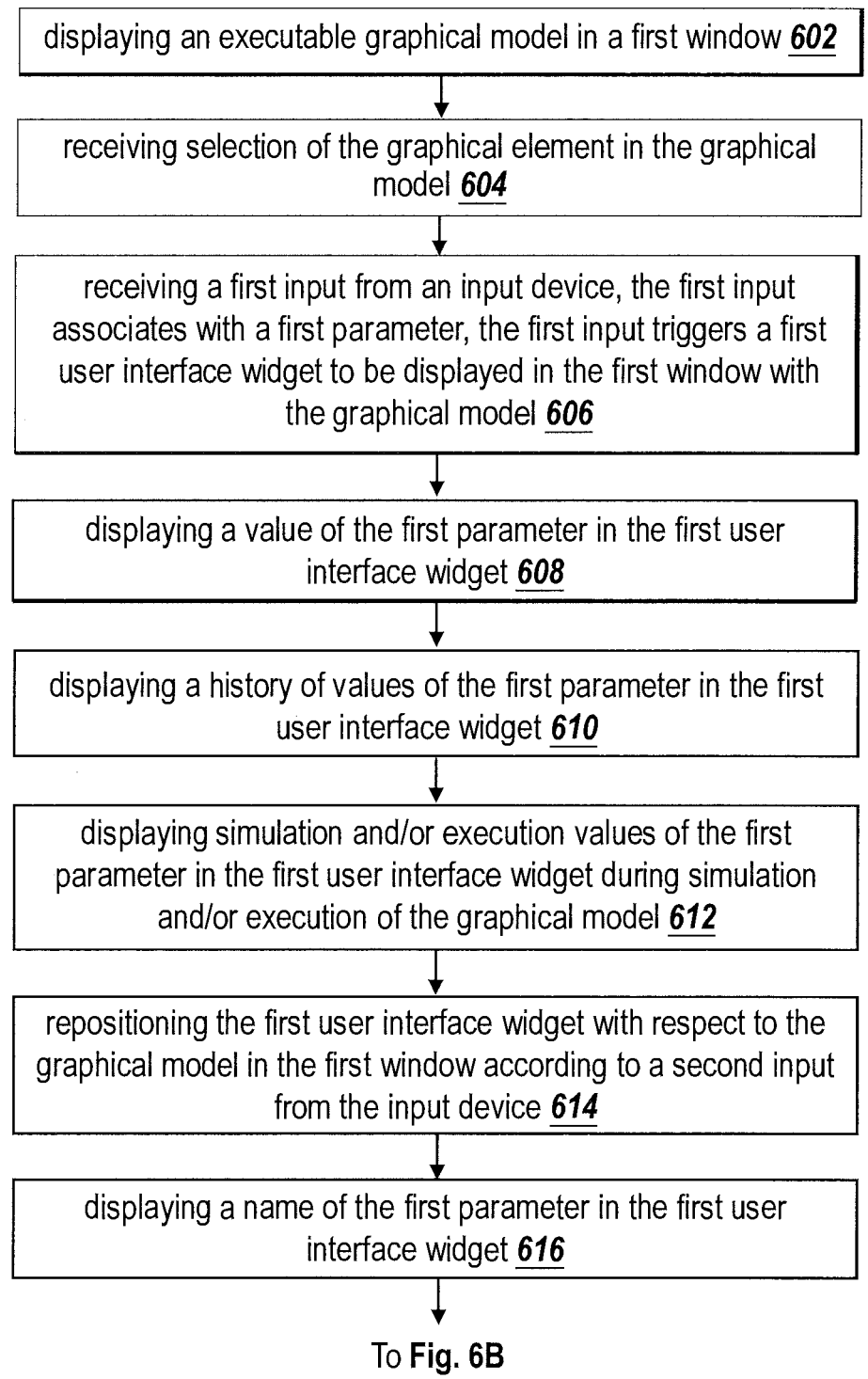
FIG. 6A illustrates a flowchart depicting exemplary processing that can be used to display and/or edit a parameter value.

FIG. 6A illustrates a flowchart depicting steps taken to display and/or edit a parameter value according to one exemplary embodiment. In step 602, an executable block diagram model 200 is displayed in a first window 500. In one embodiment, the executable block diagram model 200 is created in a time-based block diagram environment, such as a SIMULINK-compatible environment.

In step 606, modeling environment 120 receives a first input from an input device, where the first input associates with a first parameter of a block diagram modeling component in the executable block diagram model 200. In one embodiment, the first input may be from a pointing device 112, where the first input is a selection of a hotspot 304-308 associated with the first parameter. A selection may be made by having a cursor 302 hovering over the hotspot 304-308 or having a pointing device 112 clicking on the hotspot 304-308. In another embodiment, the first input may be from a keyboard 110, where the first input is a hotkey associated with the first parameter.

In still another embodiment, the first input may be a selection of a block diagram modeling component, such as a signal 202-204. A selection of the block diagram modeling component in the executable block diagram model 200 may be received in step 604. The user may enter a first input associating the block diagram modeling component with a first parameter in step 606. The first input may trigger a first user interface widget 206-208 to be displayed in the model window (i.e. the first window). In one embodiment, no additional window, such as a dialog, is needed to view and/or edit a value of a parameter. The first parameter is represented in the executable block diagram model 200 by a first graphical affordance. The first graphical affordance can be a hotspot 304-308 or a block diagram modeling component in the executable block diagram model 200.

In step 608, a value of the first parameter may be displayed by a parameter value viewer 122 in the first user interface widget 206. The value displayed in the first user interface widget 206 may be editable. The first user interface widget 206 may be always visible in the executable block diagram model 200. In one embodiment, the first user interface widget 206 may be displayed in the vicinity of the first graphical affordance. In another embodiment, the first user interface widget 206 may be a bar displayed at a side of the first window.

In step 610, a history of values of the first parameter may be optionally displayed in the first user interface widget 222. The history of values may include simulation values, user-defined values, values from different simulation runs, etc. The first user interface widget 222 is continuously updated with new simulation and/or execution values. In step 612, simulation and/or execution values of the first parameter may be optionally displayed in the first user interface widget 222 during simulation and/or execution of the executable block diagram model 200. Exemplary embodiments may provide a convenient and easy to use mechanism that allows a user to view how a parameter value changes during simulation and/or execution of the executable block diagram model 200.

In step 614, the first user interface widget may be optionally repositioned with respect to the executable block diagram model 200 in the first window according to a second input from an input device. Inputs from an input device, such as, a keyboard 110, a pointing device 112, or a touchpad may be used to reposition the user interface widget. The first input and the second input may be received from different input devices. In step 616, the first user interface widget may optionally display a name of the first parameter.

Figure 6B:
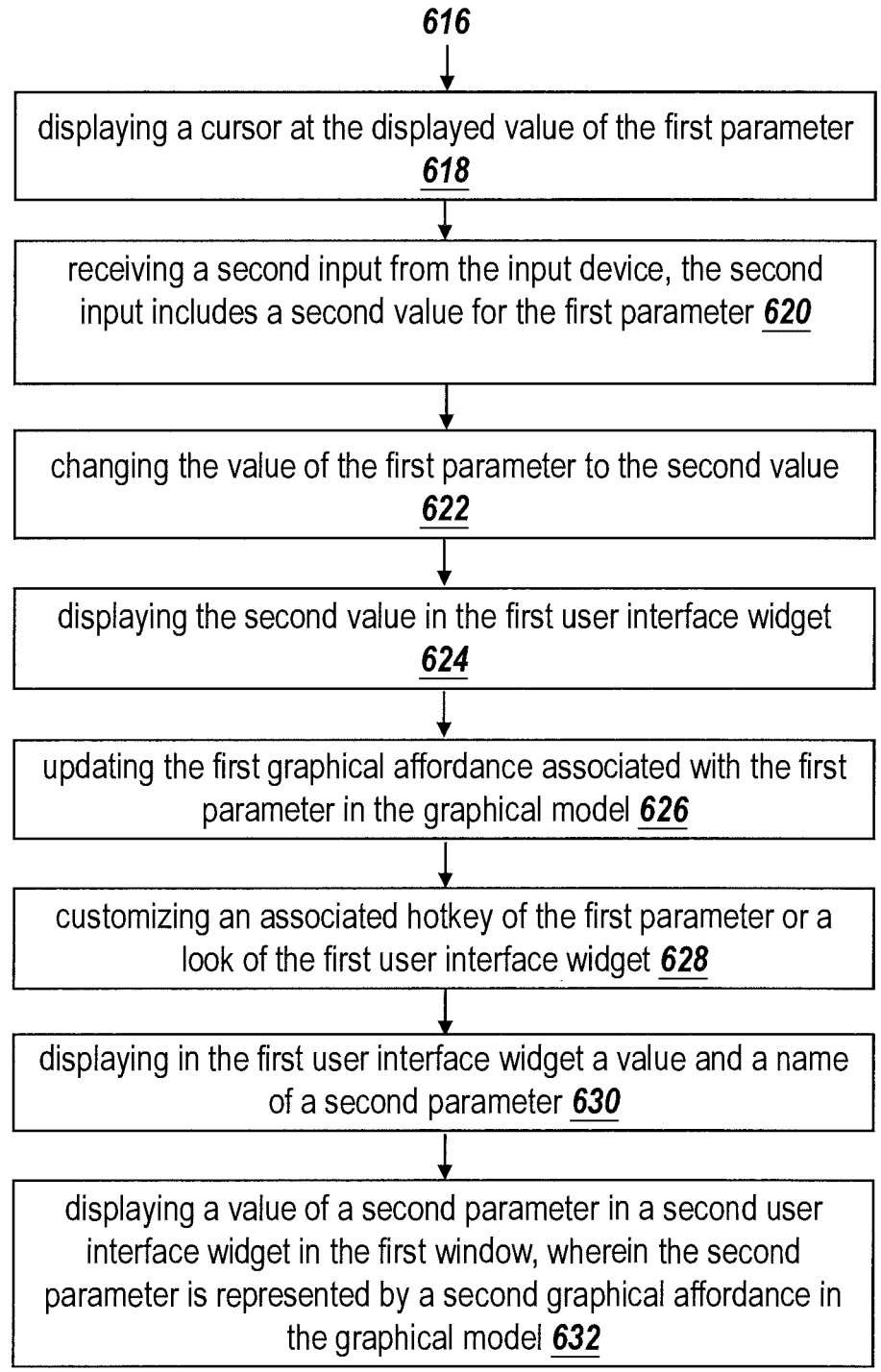
FIG. 6B illustrates additional processing with respect to FIG. 6A that may be performed to practice one exemplary embodiment.

FIG. 6B illustrates additional steps that may be taken alone or in addition to the steps shown in FIG. 6A. In step 618, a cursor 322 may be optionally displayed at the displayed value of the first parameter to allow editing of the first parameter value. In step 620, input may be optionally received from the input device, where the input includes a new value for the first parameter. The first parameter value may optionally be changed to the new value in step 622 and the new value may then be displayed in the first user interface widget 326 in step 624.

In step 626, the first graphical affordance associated with the first parameter may optionally be updated in the executable block diagram model 200. In step 628, an associated hotkey of the first parameter or an appearance of the first user interface widget 337 may be optionally customized. In step 630, a name and a value of a second parameter may optionally be displayed in the first user interface widget 337. The first user interface widget 337 may be an editable pop-up table. Alternatively, a second user interface widget may be used in the first window to display the second parameter in step 632. The second parameter may be represented by a second graphical affordance in the executable block diagram model. In one embodiment, the second parameter may have a different hotkey than the first parameter.

Figure 7:
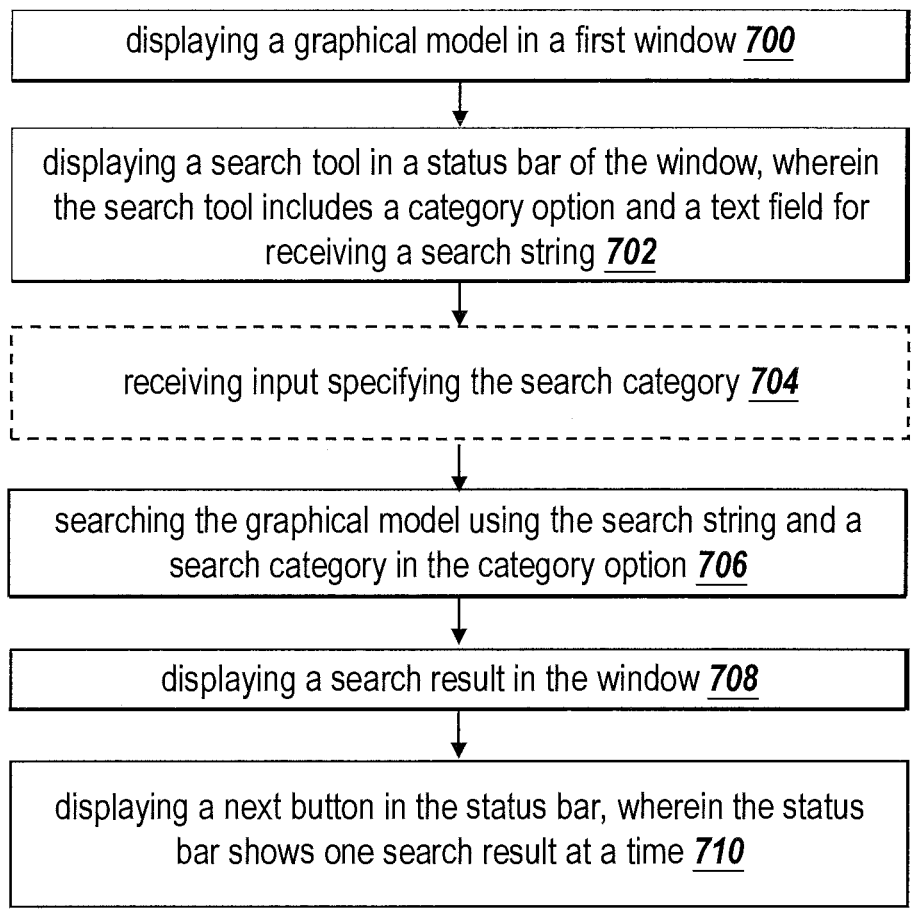
FIG. 7 illustrates a flowchart depicting exemplary processing that can be used to search for a parameter according to one exemplary embodiment.

FIG. 7 illustrates a flowchart depicting steps taken to search for a parameter according to one embodiment. In step 700, an executable block diagram model 200 is displayed in the first window 500. In step 702, the search tool is displayed in a status bar 508 of the window 500, where the search tool includes a category option 516 and a text field 518 for receiving a search string. In optional step 704, modeling environment 120 may receive input specifying the search category. For example, the input may be a hotkey associated with the search category. In step 706, the search string and a search category in the category option 516 may be used to search the executable block diagram model 200.

In step 708, a search result may be displayed in the window 500. The search result may be displayed by highlighting one or more block diagram modeling components or one or more hotspots in the executable block diagram model 200. The search result may alternatively be displayed in a panel in the window 500. In another aspect, the search result may be displayed in a status bar 508. In step 710, a next button 514 may be optionally provided in a status bar 508 to show additional search result that is not able to be displayed in the status bar 508. In one embodiment, the status bar 508 shows one search result at a time, and the next button 514 is used to browse through the list of search results. In another embodiment, a previous button, an end and being button, and/or a button to move forward and backward by multiple results may be provided.

Figure 8A:
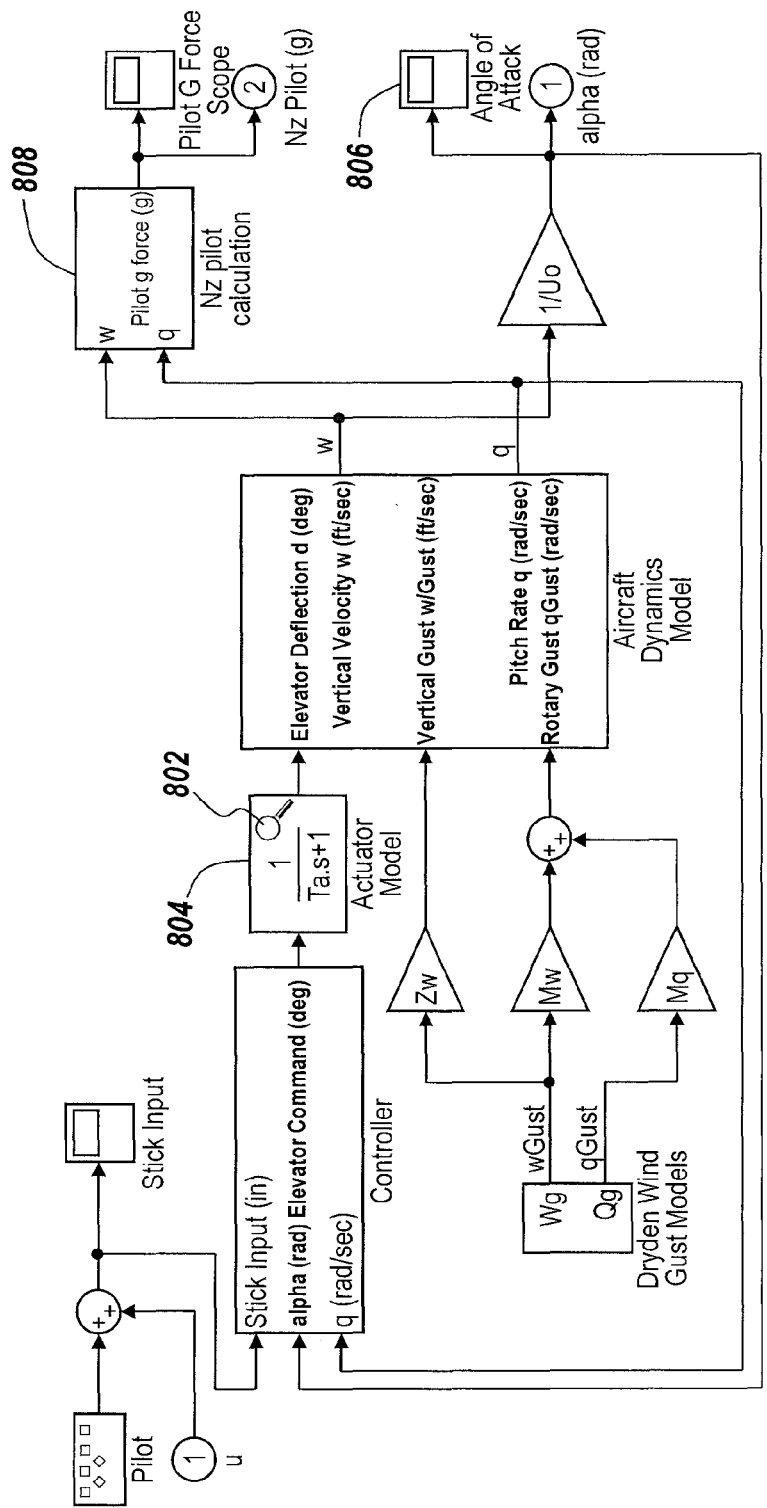
FIG. 8A illustrates an exemplary executable block diagram model that is referenced in FIGS. 8B to 8H for describing exemplary graphical user interfaces for viewing a specified level of detail of a block diagram modeling component.

FIG. 8A illustrates an exemplary executable block diagram model that is referenced in FIGS. 8B to 8H for describing exemplary graphical user interfaces for viewing specified levels of detail for a block diagram modeling component. As a user browses/navigates in an executable block diagram model, different levels of detail of block diagram modeling components may be displayed. Model 800 models an operation of an aircraft. In model 800, various blocks, such as blocks 804, 806, and 808, model different aspects of the aircraft and data analysis functionality. A multi-level detail viewer may be used to browse model 800 so that details of a block diagram modeling component can be viewed, for example, when lens cursor 802 is within a region that activates the display of the details. In one embodiment, different types of block diagram modeling component may have different levels of detail and different numbers of levels of details.

Figure 8B:
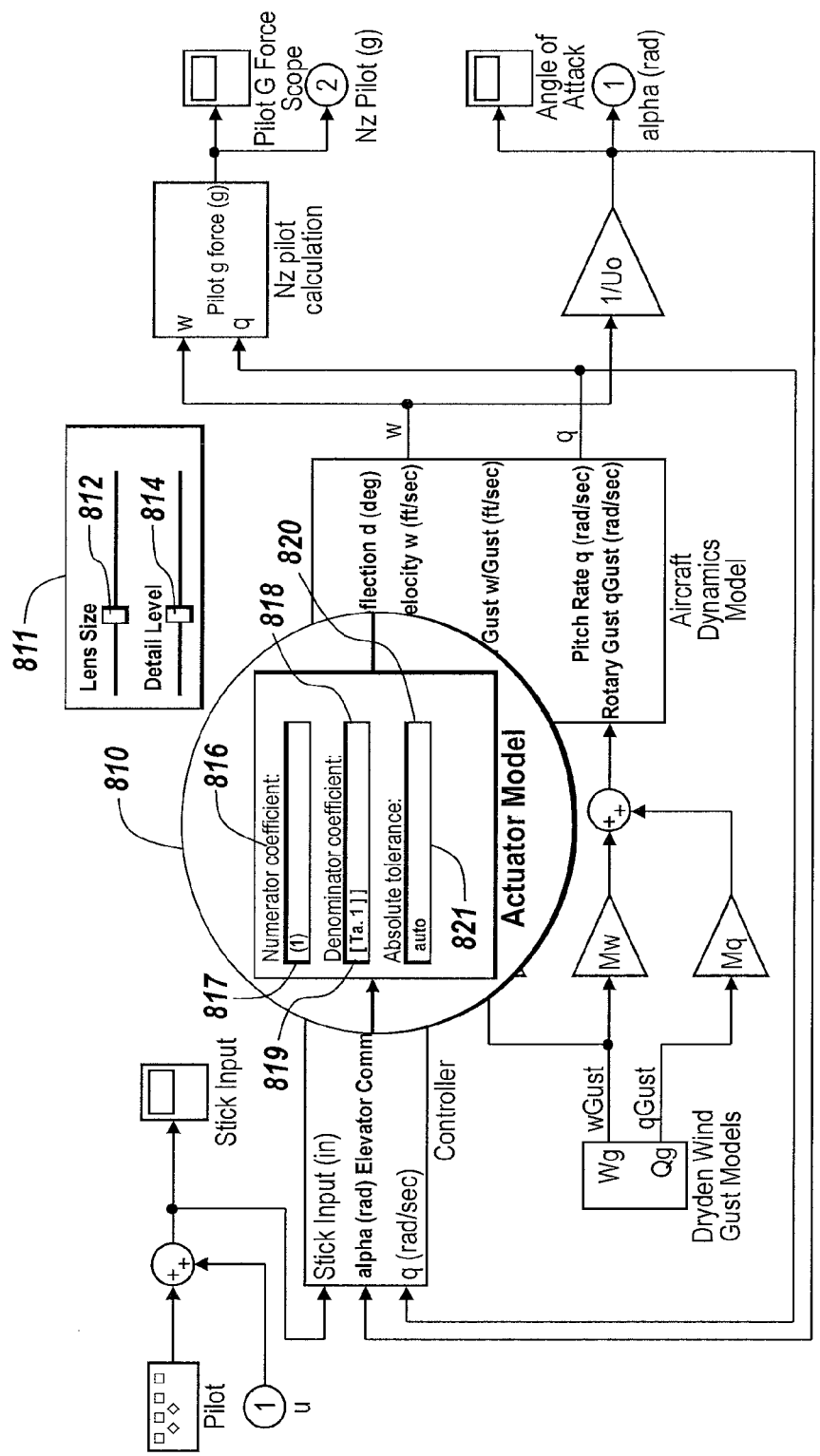
FIG. 8B illustrates an exemplary graphical user interface for viewing different levels of detail of a block diagram modeling component.

FIG. 8B illustrates an exemplary graphical user interface for viewing different levels of detail of a block diagram modeling component. In one embodiment, a lens-like widget 810 is displayed over block 804 when lens cursor 802 moves within a region that activates the display of lens-like widget 810. Widget 810 may display three parameters: numerator coefficient 816 and its corresponding value, denominator coefficient 818 and its corresponding value, absolute tolerance 820 and its corresponding value. A user may modify the existing value of a parameter in the lens-like widget 810. Text fields 816, 818, and 820 are provided to allow a user to modify a value of numerator coefficient 817, denominator coefficient 819, and absolute tolerance 821, respectively.

A control panel 811 may be provided to let a user change properties related to lens-like widget 810. Control panel 811 includes a lens size control slider 812 and detail level control slider 814. Lens size control slider 812 enables a user to adjust the size (i.e. diameter) of the lens-like widget 810 while detail level control slider 814 enables a user to select a specific detail level of block 804 to display in the lens-like widget 810. Each block in an executable block diagram model may have different levels of details. For example, a block may have a parameter level showing details regarding the parameter values and a generated code level showing details regarding the generated code from the block. Although exemplary embodiments are discussed with specific level of details, the invention is not limited to these specific levels of details discussed herein. There may be other embodiments where users may configure the parameters to create a fisheye view using the lens-like widget 810.

Figure 8C:
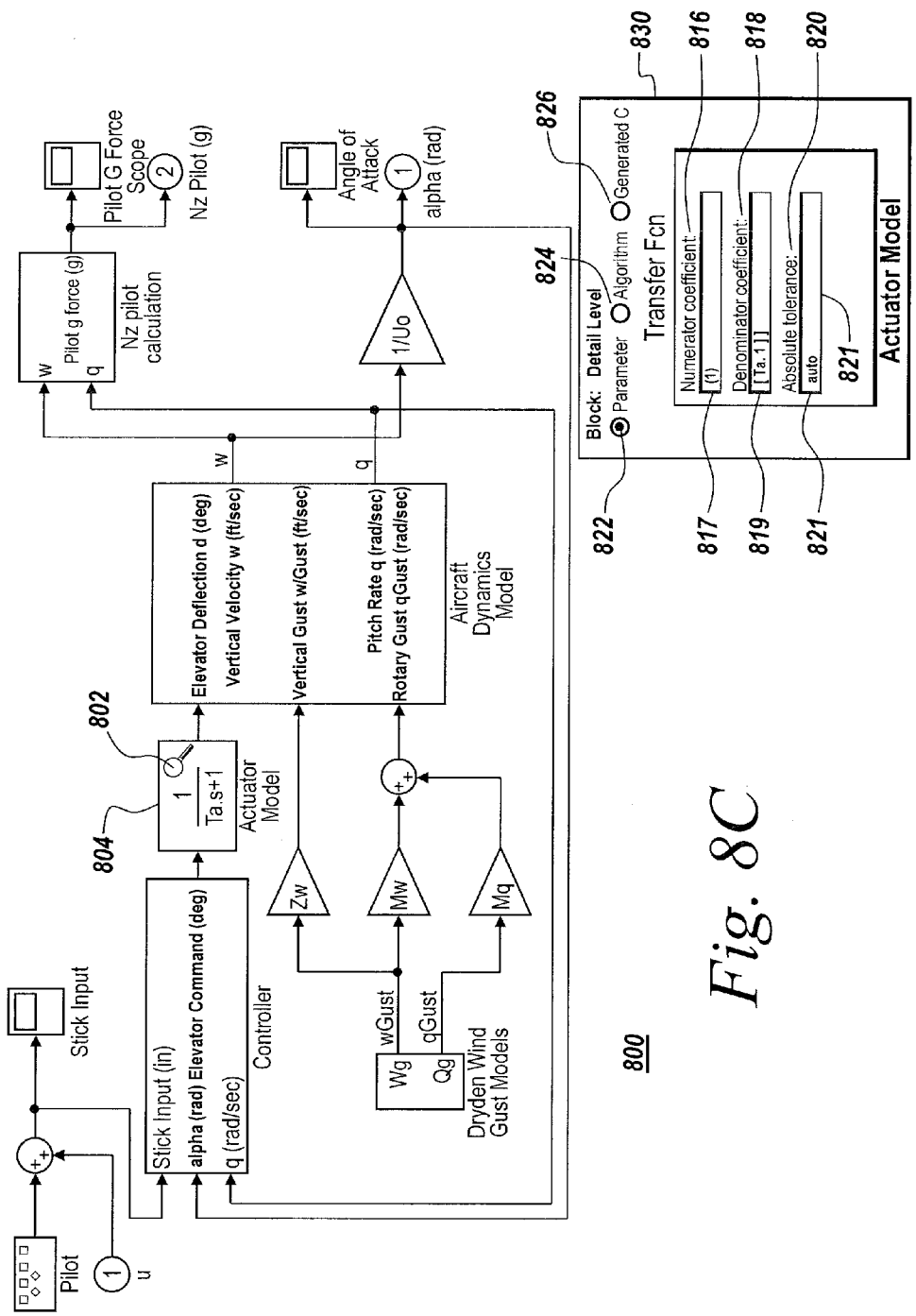
FIG. 8C illustrates another exemplary graphical user interface for viewing different levels of detail of a block diagram modeling component.

FIG. 8C illustrates another exemplary graphical user interface for viewing different levels of detail of a block diagram modeling component. Instead of using a lens-like widget 810, FIG. 8C shows that a viewer widget 830 is used to display the parameters and their values. In one embodiment, viewer widget 830 may be displayed in the model window. In another embodiment, viewer widget 830 may be displayed in a separate window.

Viewer widget 830 includes a radio button 822 for selecting a parameter level of detail, a radio button 824 for selecting an algorithm level of detail, a radio button 826 for selecting a generated code level of detail. For each level of detail, specific information regarding a block diagram modeling component can be displayed. The parameter radio button 822 is selected in FIG. 8C and hence, parameters, such as numerator coefficient 816 and its corresponding value, denominator coefficient 818 and its corresponding value, absolute tolerance 820 and its corresponding value are displayed in viewer widget 830. A user can modify a value of numerator coefficient 817, denominator coefficient 819, and absolute tolerance 821 via text fields 816, 818, and 820, respectively.

Figure 8D:
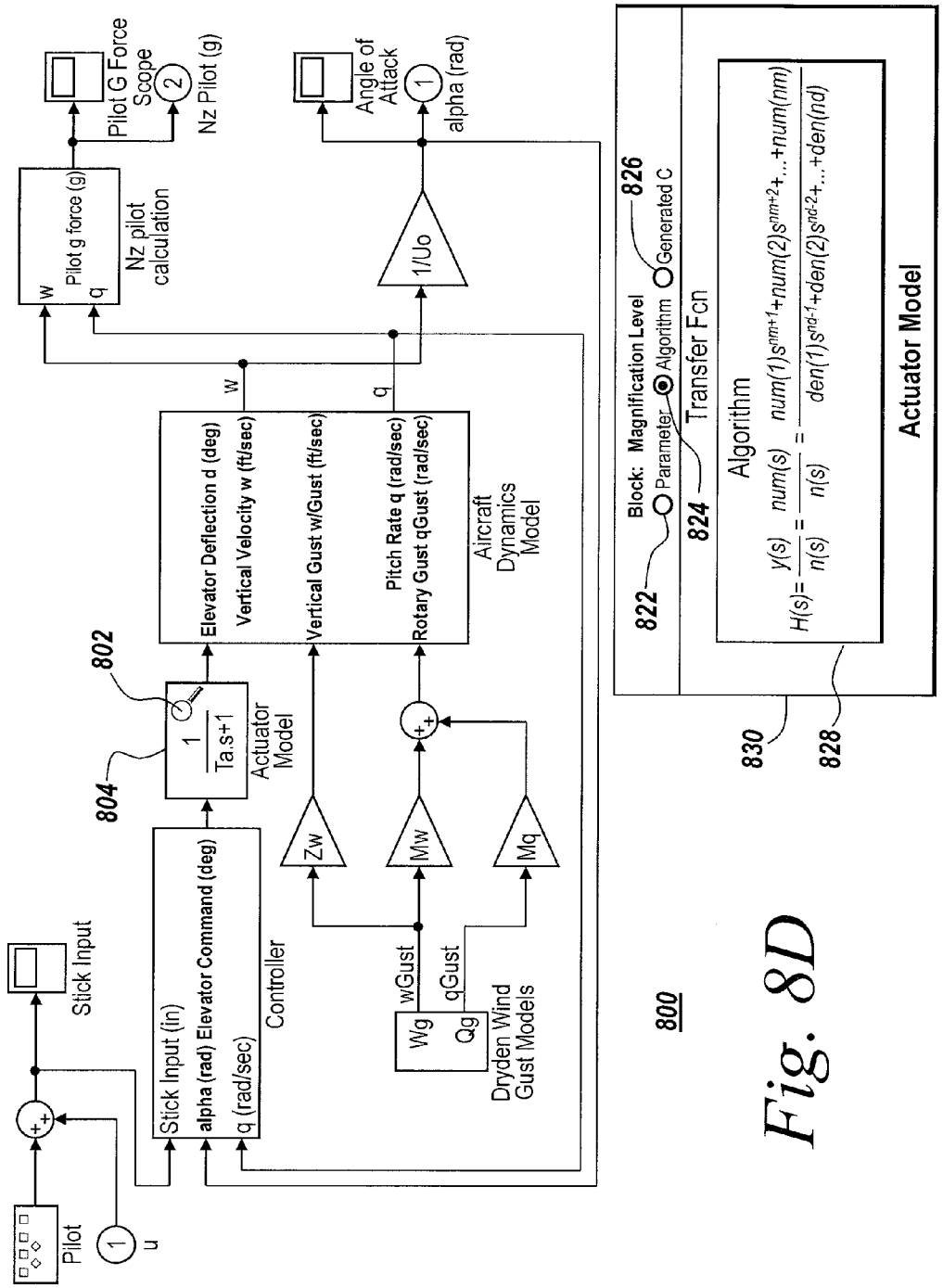
FIG. 8D illustrates an exemplary algorithm detail of a block diagram modeling component.

FIG. 8D illustrates details of an exemplary algorithm used with a block diagram modeling component. FIG. 8D shows that algorithm radio button 824 is selected in viewer widget 830 instead of parameter radio button 822. Accordingly, viewer widget 830 displays the algorithm level of detail for block 804 in display panel 828. An algorithm level of detail is associated with the algorithm that is used in the corresponding block. In one embodiment, the algorithm may be shown using one or more equations that relate the output(s) of the block with the input(s).

Figure 8E:
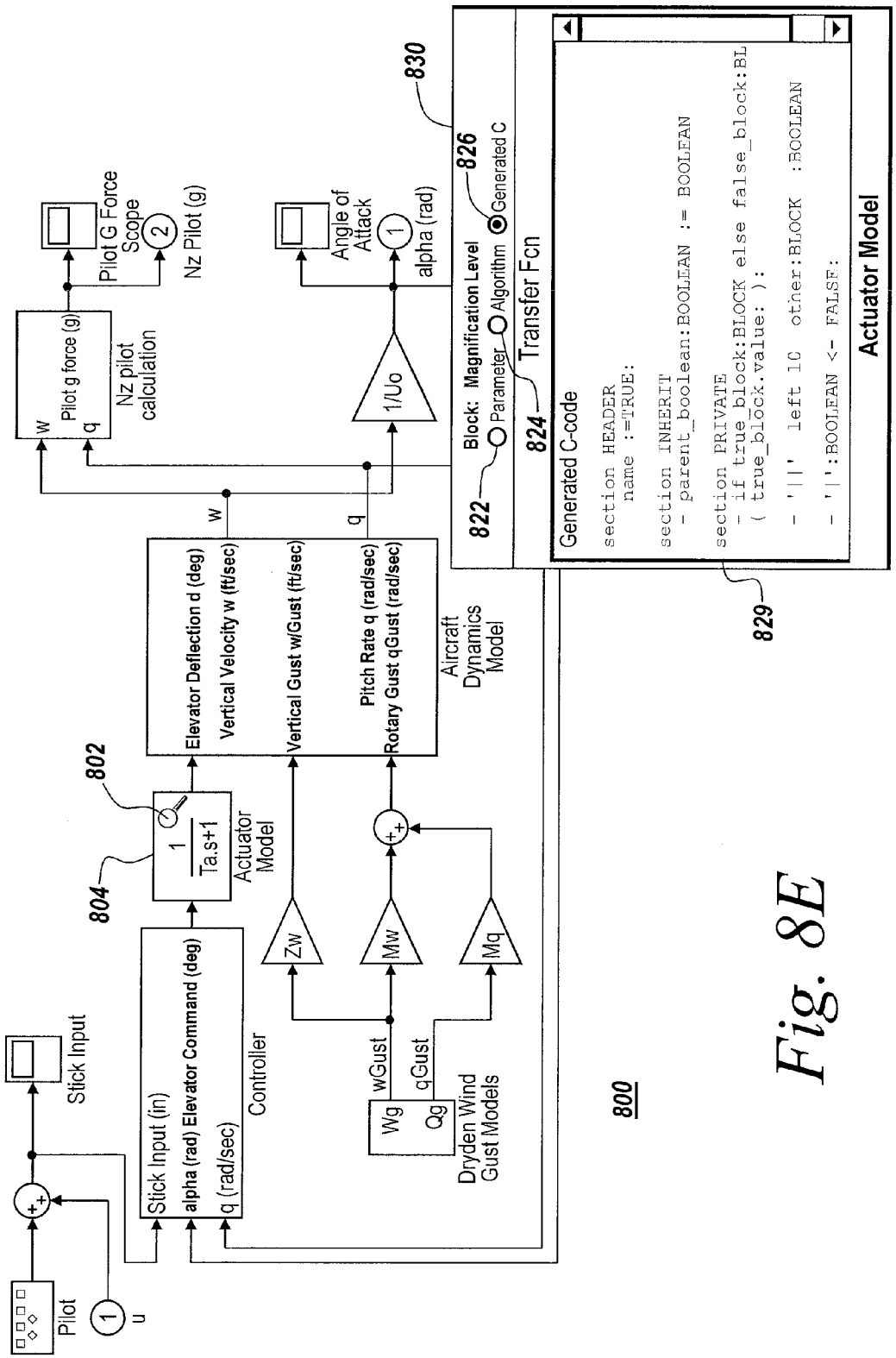
FIG. 8E illustrates an exemplary generated code detail of a block diagram modeling component.

FIG. 8E illustrates exemplary generated code detail of a block diagram modeling component. FIG. 8E shows that generated code radio button 826 is selected in viewer widget 830. Details of generated code for block 804 are displayed in display panel 829. One of ordinary skill in the art will appreciate that although FIGS. 8C to 8E show three specific levels of detail, the present invention is not limited to the specific levels of detail discussed herein. In addition, different levels of detail may be shown concurrently according to one embodiment.

Figure 8F:
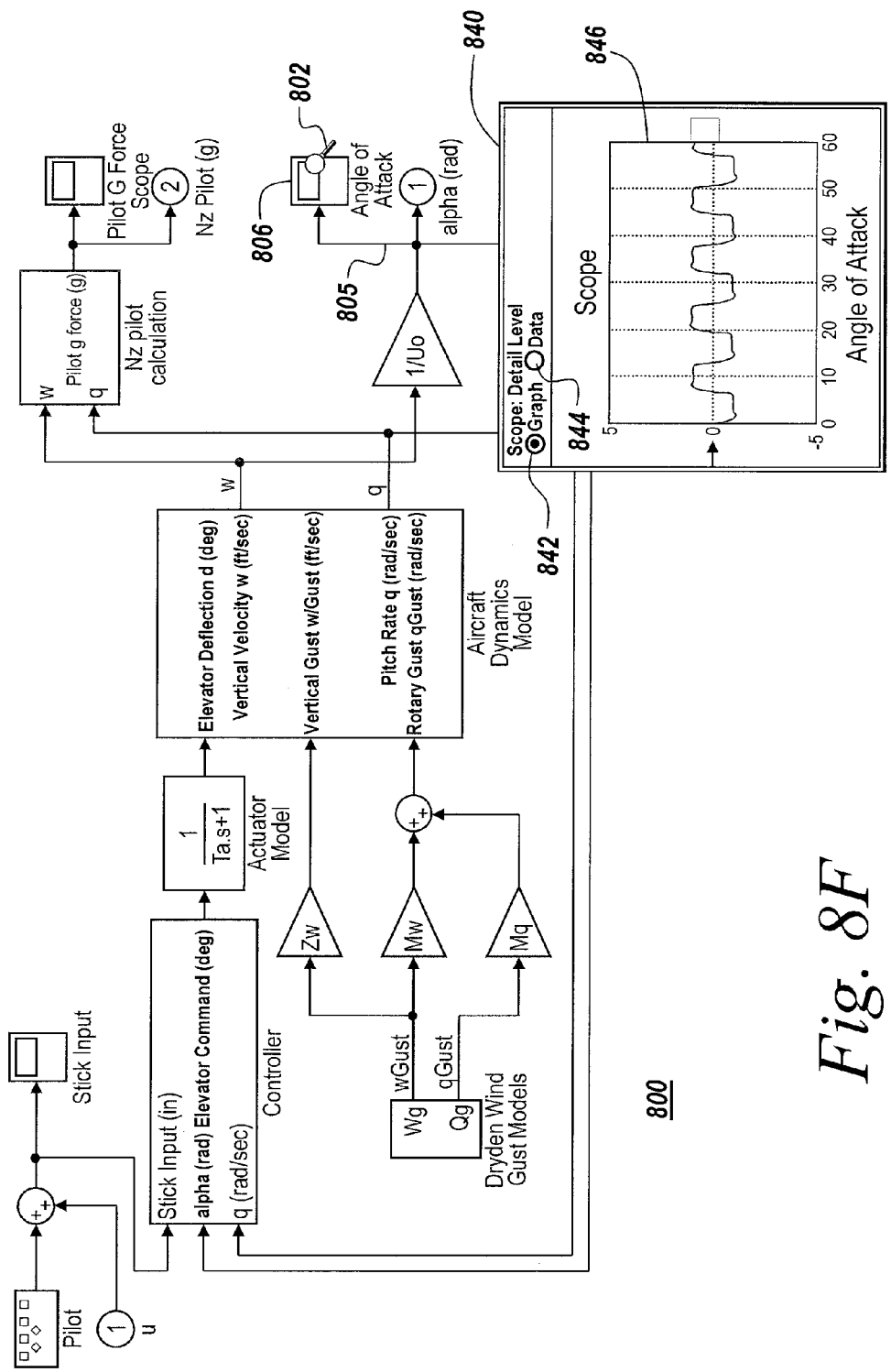
FIG. 8F illustrates an exemplary graph detail of a block diagram modeling component.

FIG. 8F illustrates an exemplary graph level of detail of a block diagram modeling component. In one embodiment, when lens cursor 802 moves within a region of block 806, viewer widget 840 may be displayed in the model window to show a specified level of detail. Block 806 represents a scope where a user can review values of an input signal 805 with respect to time. For block 806, two different levels of detail instead of three are available for display in viewer widget 840. Viewer widget 840 has a radio button 842 for selecting to show a graph detail and a radio button 844 for selecting to show a data detail in viewer widget 840. In FIG. 8F, graph radio button 842 is selected and a graph 846 is displayed in viewer widget 840.

Figure 8G:
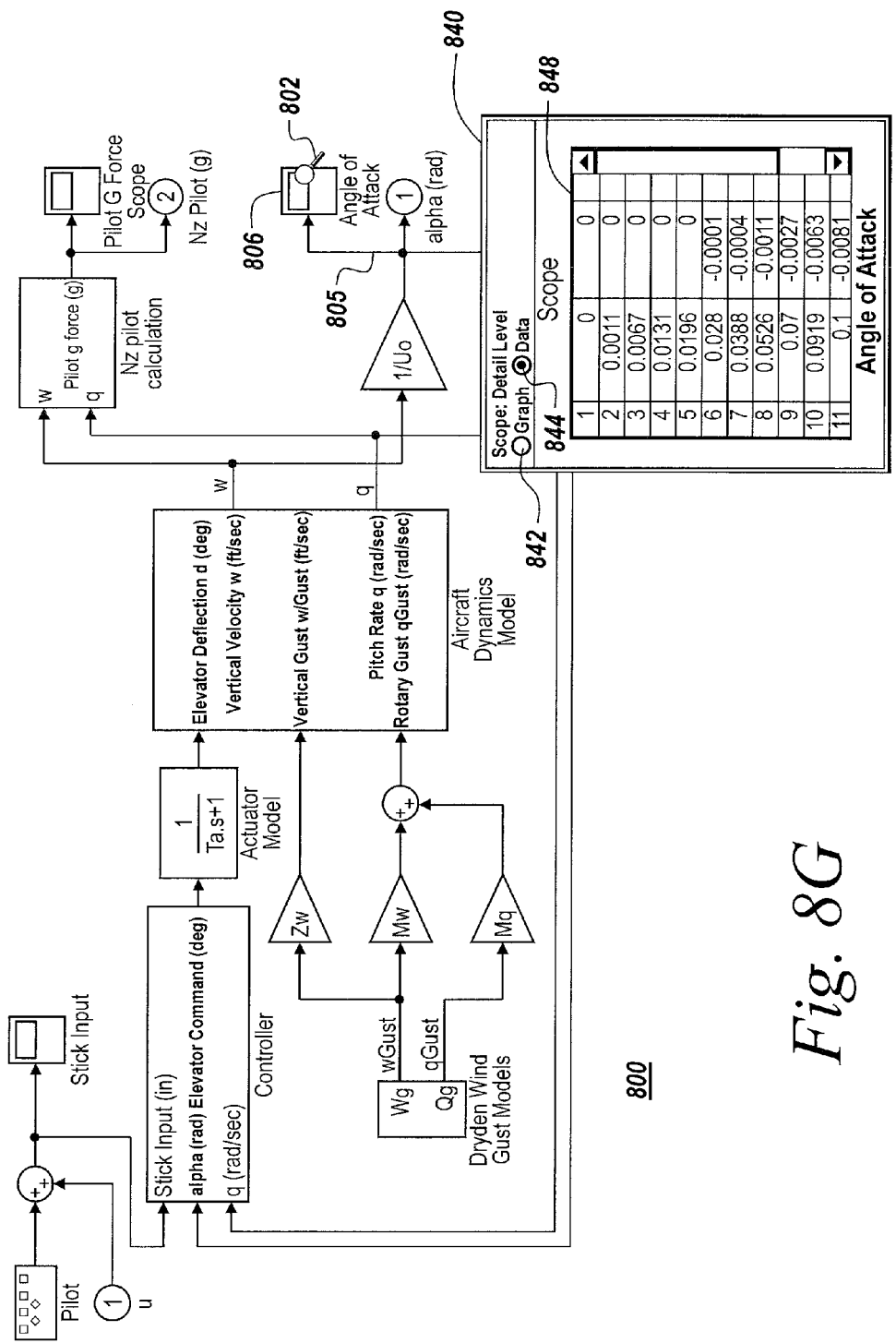
FIG. 8G illustrates an exemplary data detail of a block diagram modeling component.

FIG. 8G illustrates an exemplary data level of detail of a block diagram modeling component. In FIG. 8G, data radio button 844 is selected instead of graph radio button 842 in viewer widget 840. Accordingly, viewer widget 840 displays data for the input signal 805 of block 806 with respect to time. One of ordinary skill in the art will appreciate that although FIGS. 8F to 8G show two specific levels of detail, the present invention is not limited to the specific levels of detail discussed herein.

Figure 8H:
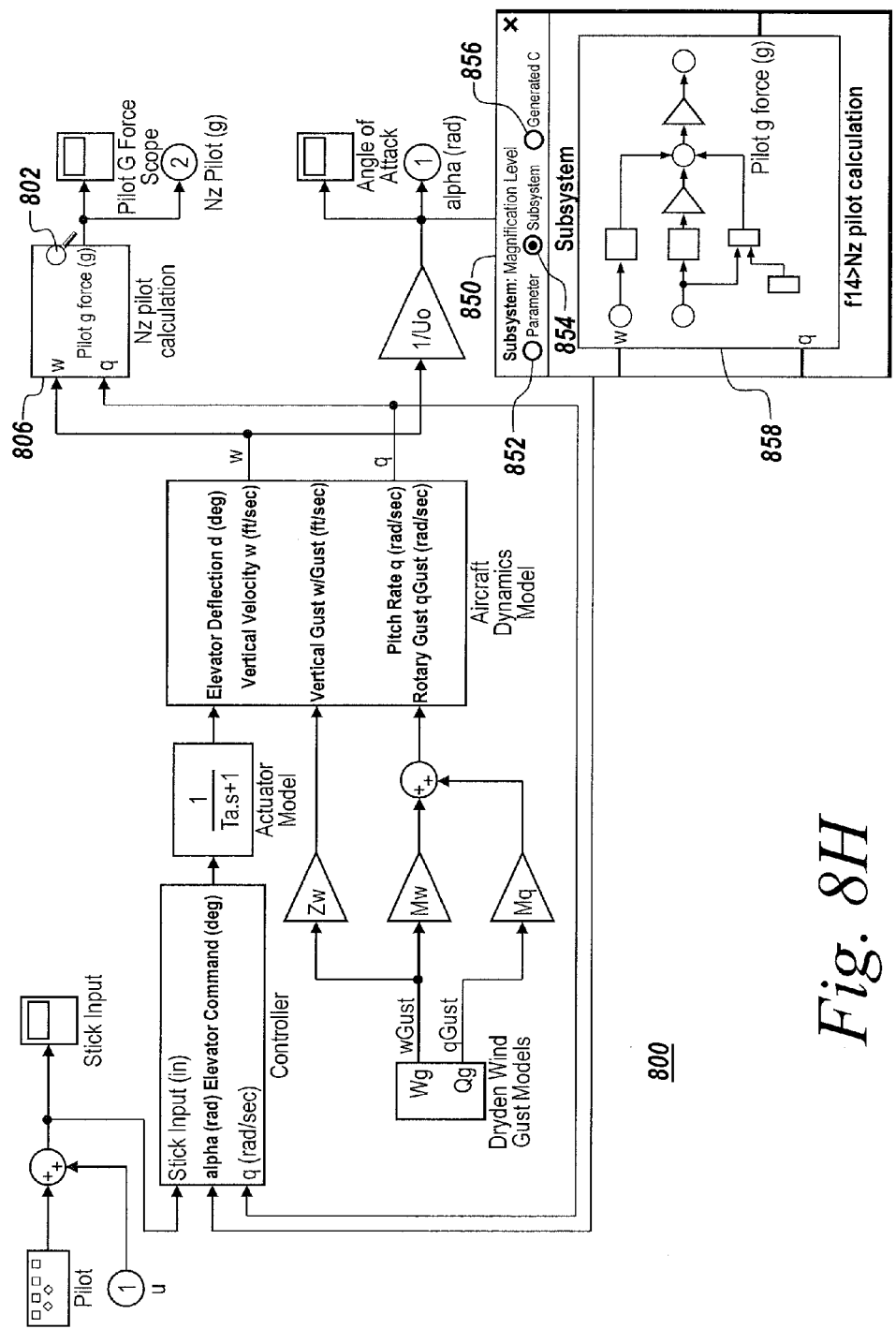
FIG. 8H illustrates an exemplary subsystem detail of a block diagram modeling component.

FIG. 8H illustrates an exemplary subsystem detail of a block diagram modeling component. In one embodiment, when lens cursor 802 moves within a region of block 808, viewer widget 850 is displayed to show details of block 808. In another embodiment, block 808 may be selected with the lens cursor 802 being active and cause the viewer widget 850 to display the details of block 808. Viewer widget 850 includes a radio button 852 for selecting a parameter detail, a radio button 854 for selecting a subsystem detail, a radio button 856 for selecting a generated code detail. In FIG. 8H, subsystem radio button 854 is selected. Accordingly, viewer widget 850 displays in panel 858 the block diagram modeling components that made up the subsystem in block 808. One of ordinary skill in the art will appreciate that although FIG. 8H shows three specific levels of detail, the present invention is not limited to the specific levels of detail discussed herein.

One of ordinary skill in the art will appreciate that although FIGS. 8A-8H are discussed with exemplary GUI widgets, the present invention is not limited to the exemplary GUI widgets described herein.

Figure 9A:
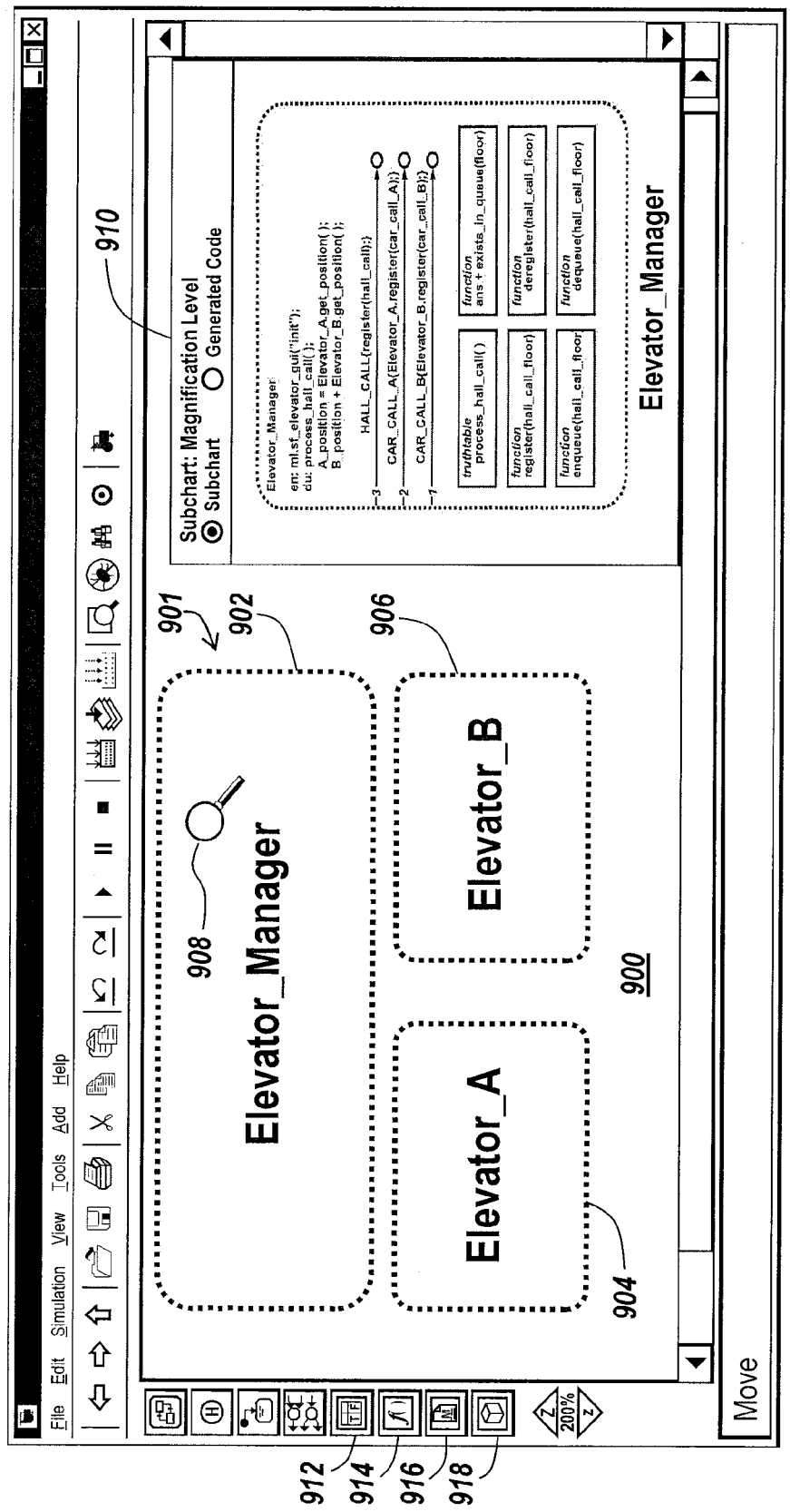
FIG. 9A illustrates an exemplary statechart that is referenced in FIGS. 9B and 9C for describing exemplary graphical user interfaces for viewing a specified level of detail of a statechart component.
Figure 9B:
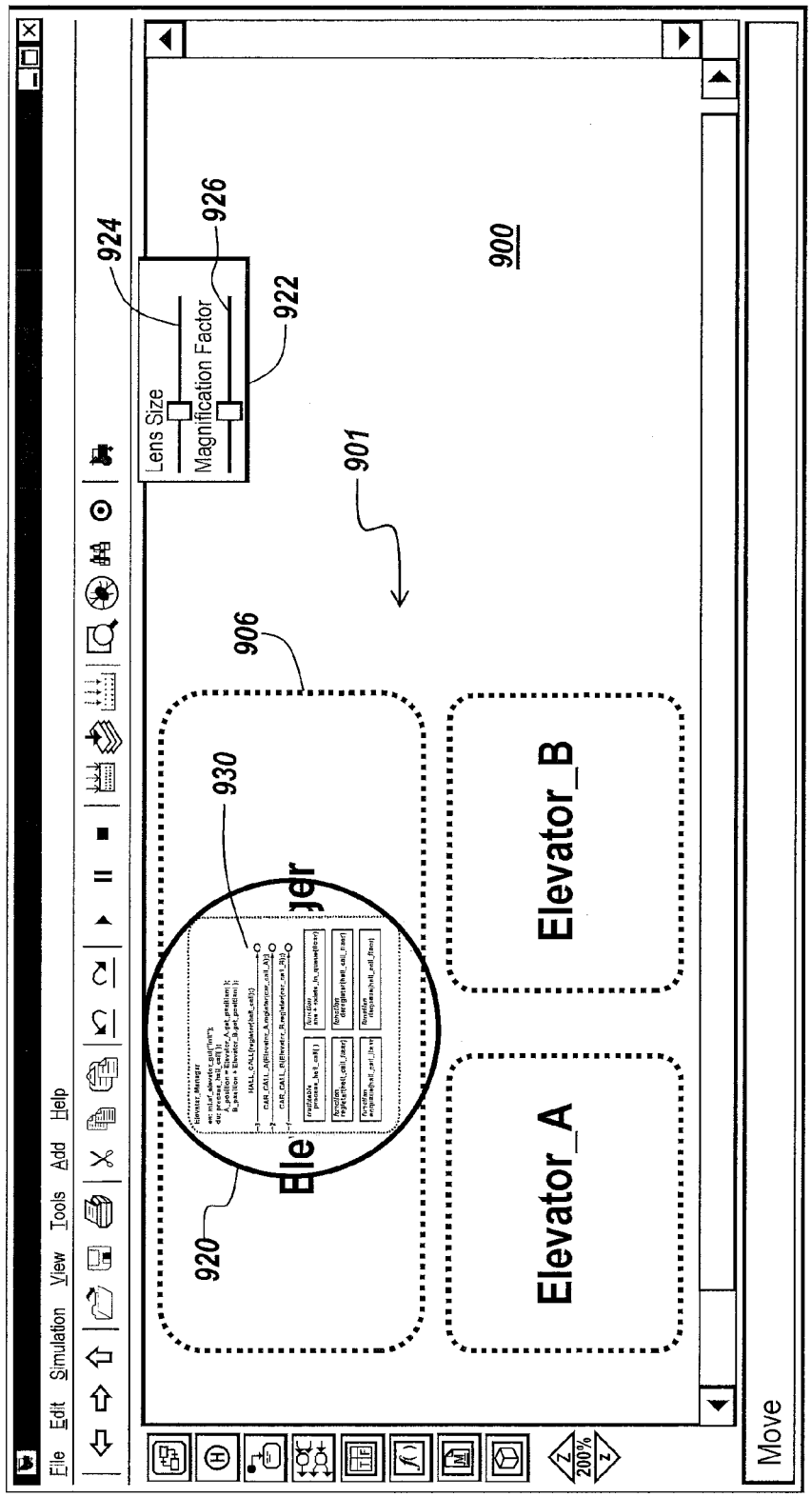
FIG. 9B illustrates an exemplary graphical user interface for viewing different levels of detail of a statechart component.
Figure 9C:
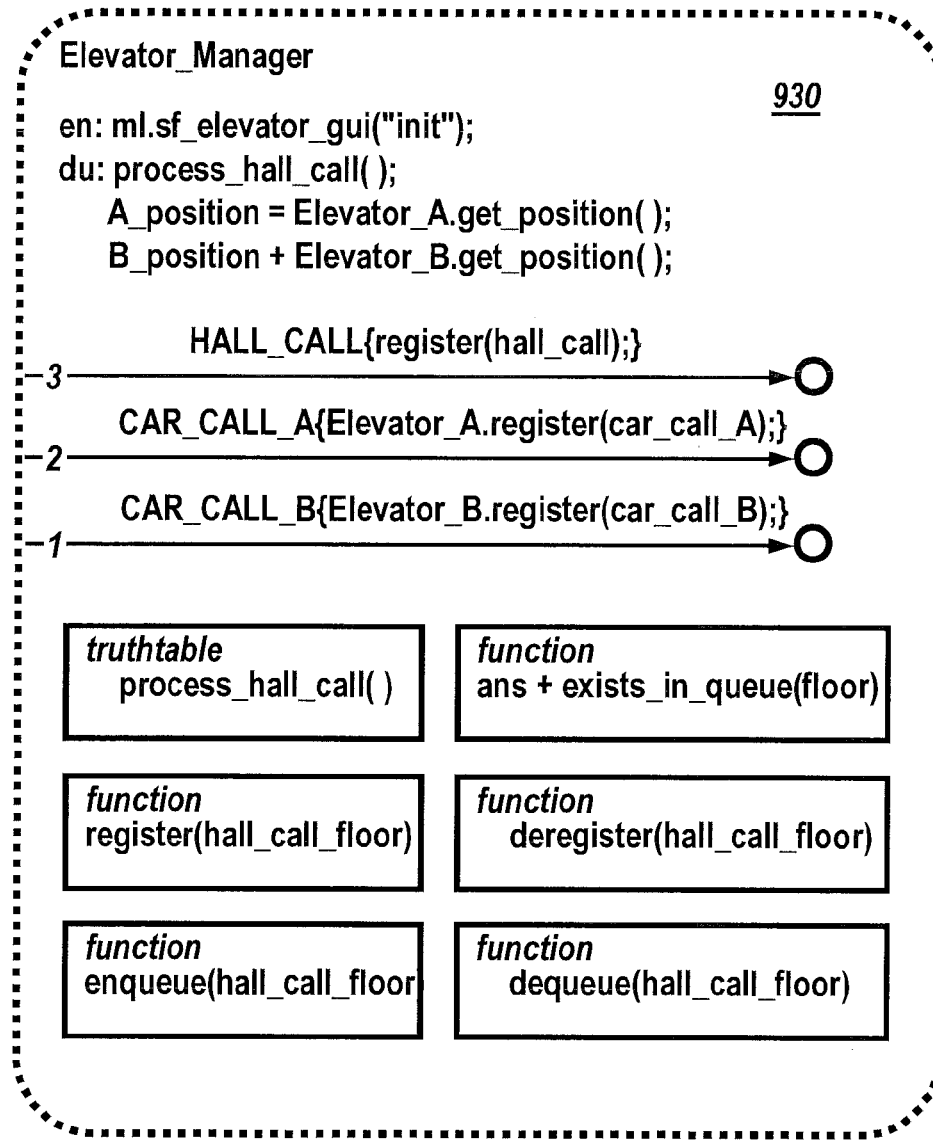
FIG. 9C illustrates a close-up view of the statechart component.

FIG. 9A illustrates an exemplary statechart that is referenced in FIGS. 9B and 9C for describing how to model a two car elevator system illustrating some of the common elements of modern elevators such as call queuing, fire alarm responses, hall calls and the like. The statechart is created using Stateflow® of MathWorks Inc, of Natick Mass. and it illustrates a rich set of Stateflow® features such as the ability to call MATLAB functions 914, embedded MATLAB 916, graphical functions 918 and truth table blocks 912. In addition, it uses Stateflow® semantics such as parallel state decomposition, event broadcasts, inner transitions and the like. As a user browses/navigates in a statechart, different levels of detail of statechart components may be displayed.

FIGS. 9A and 9B illustrate exemplary graphical user interfaces for viewing different levels of detail of a statechart component. In one embodiment as depicted in FIG. 9A, the magnification tool 908 is placed over a subchart 902 in Stateflow® chart 901. Placing the magnification tool 908 over the subchart 902 enables a user to see into the subchart 902 in the viewing window 910 at the bottom right of the Stateflow® environment 900. User is also presented with the option of seeing even deeper into the subchart 902 by providing the option to see the generated code 930.

FIG. 9B illustrates a magnification lens 920 being placed over the subchart 906 in Stateflow® chart 901. The magnification lens 920 provides the user with a detailed view of the elements beneath the exterior block. A close-up view of block elements 930 is illustrated in FIG. 9C. A control panel 922 may be provided to let a user change properties related to lens-like widget 920. Control panel 922 includes a lens size control slider 924 and magnification factor control slider 926. Lens size control slider 924 enables a user to adjust the size (i.e. diameter) of lens-like widget 920 while magnification factor control slider 926 enables a user to select a specific detail level of block 906 to display in the lens-like widget 920.

Figure 10A:
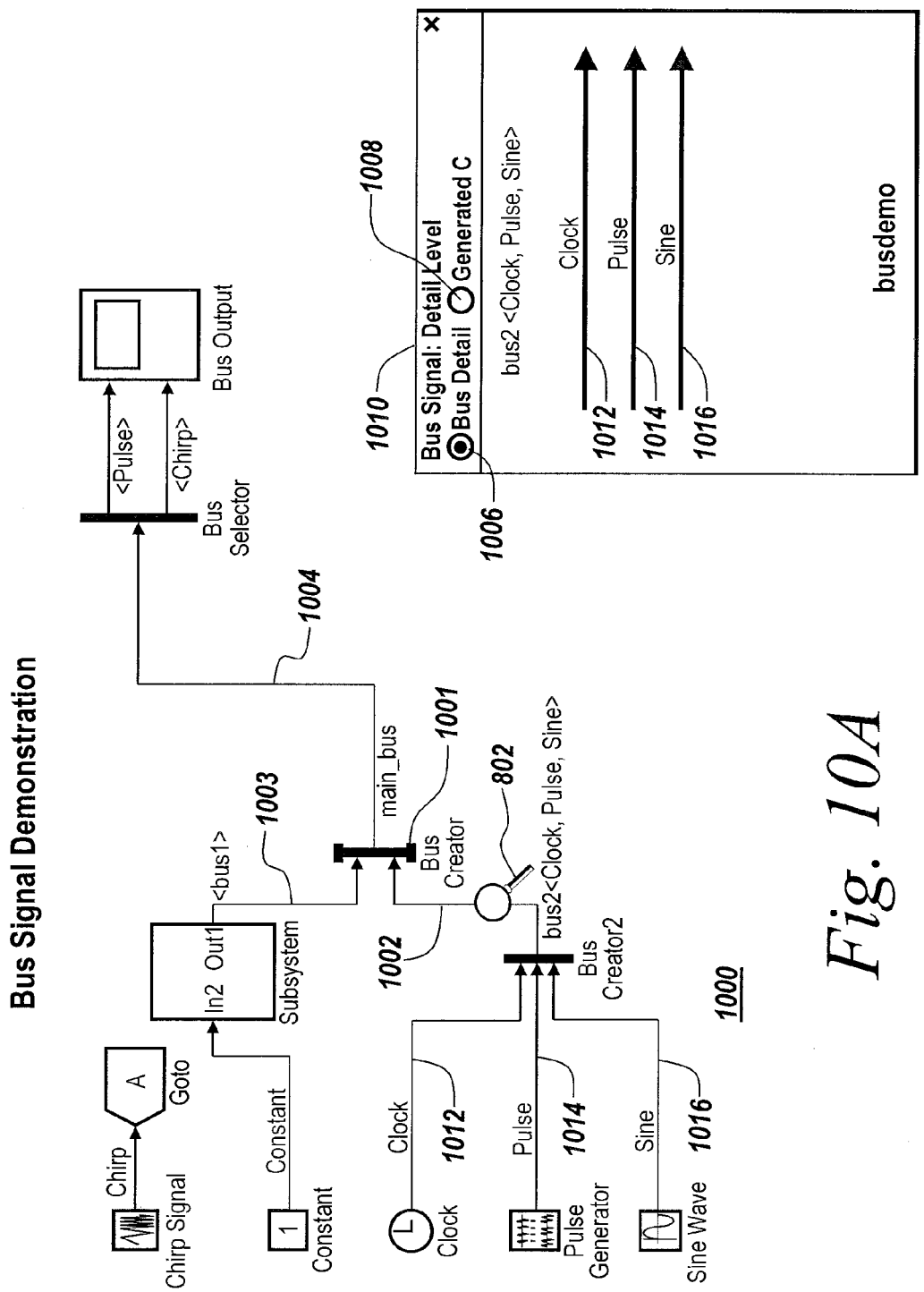
FIG. 10A illustrates an exemplary detail of a composite signal.
Figure 10B:
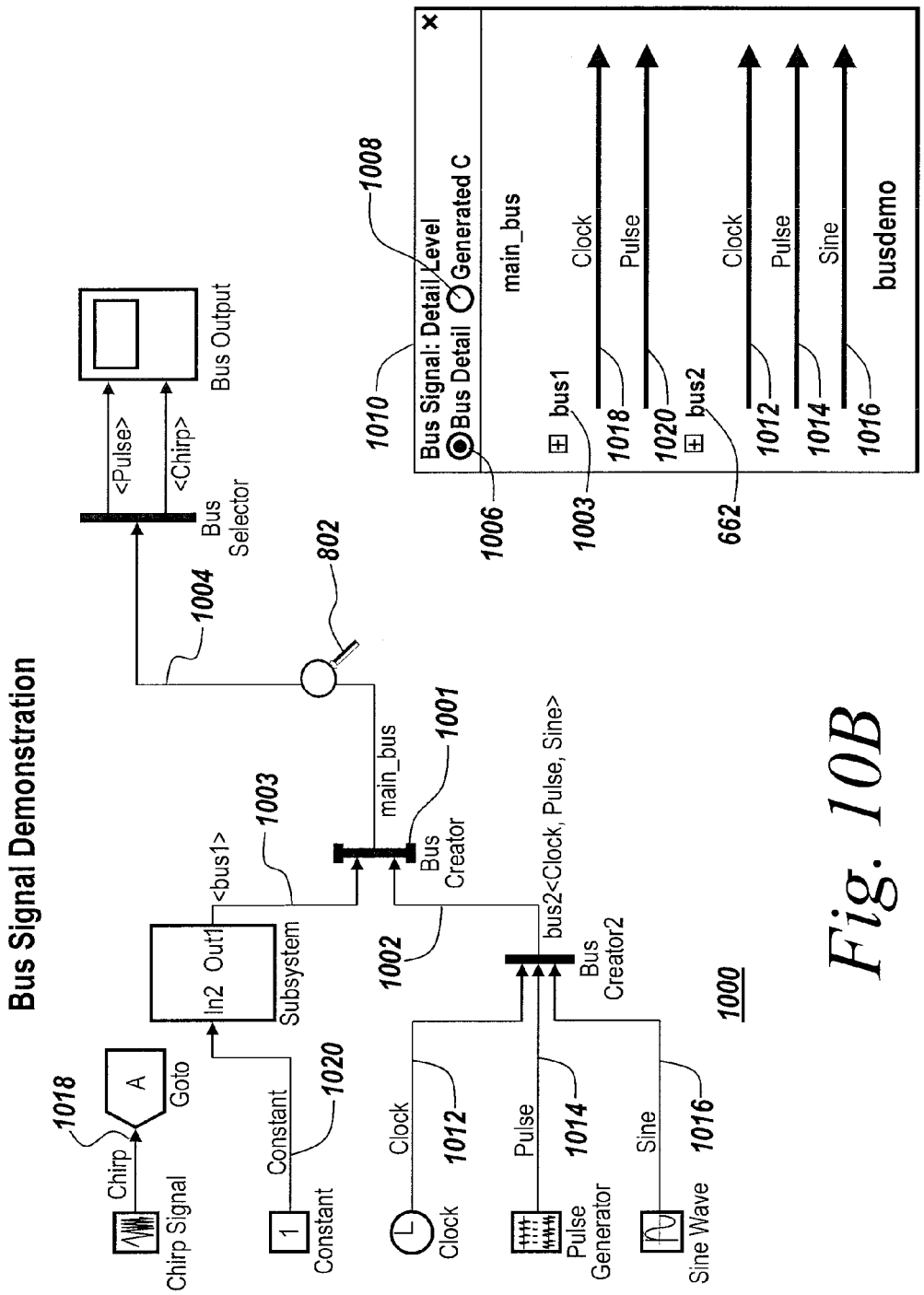
FIG. 10B illustrates another exemplary detail of a composite signal.

FIGS. 10A and 10B illustrate another exemplary use of lens cursor 802. FIG. 10A illustrates an exemplary detail of a composite signal. FIG. 10A shows model 1000 that combines bus 1 (signal 1003) and bus 2 (signal 1002) to create main_bus (signal 1004) via a bus creator 1001. In one embodiment, lens cursor 802 is placed on a bus to view details of a bus. FIG. 10A shows that lens cursor 802 is placed on bus 2 (signal 1002) and viewer widget 1010 is displayed to show a specified level of detail of bus 2. Viewer widget 1010 has a radio button 1006 for selecting a bus detail and a radio button 1008 for selecting a generated code detail to display in viewer widget 1010. In FIG. 10A, radio button 1006 for bus detail is selected. Viewer widget 1010 shows that signal 1002 includes clock signal 1012, pulse signal 1014 and sine signal 1016.

FIG. 10B illustrates another exemplary detail of a composite signal. In FIG. 10B, lens cursor 802 is positioned on top of signal 1004 and bus detail radio button 1006 is still selected in viewer widget 1010. Accordingly, viewer widget 1010 shows that signal 1004 includes two buses: bus 1 (signal 1003) and bus 2 (signal 1002), where bus 1 includes chirp signal 1018 and constant signal 1020 while bus 2 includes clock signal 1012, pulse signal 1014 and sine signal 1016.

One of ordinary skill in the art will appreciate that although FIGS. 10A-10B show two specific levels of detail, the present invention is not limited to the specific levels of detail discussed herein. Although FIGS. 10A-10B are discussed with exemplary GUI widgets, the present invention is not limited to the exemplary GUI widgets described herein.

In one embodiment, the use of different levels of details of a block diagram modeling component may help in identifying a problematic part of a model. In one embodiment, an evaluation such as a check or test may be run on a model and one or more links may be provided to a level of detail that shows the problematic part of the model. In one embodiment, the problematic part of the model may be highlighted in the level of detail so that a user can easily identify the problematic part that needs to be fixed instead of searching through the model to determine what aspect of a block is problematic.

Figure 11A:
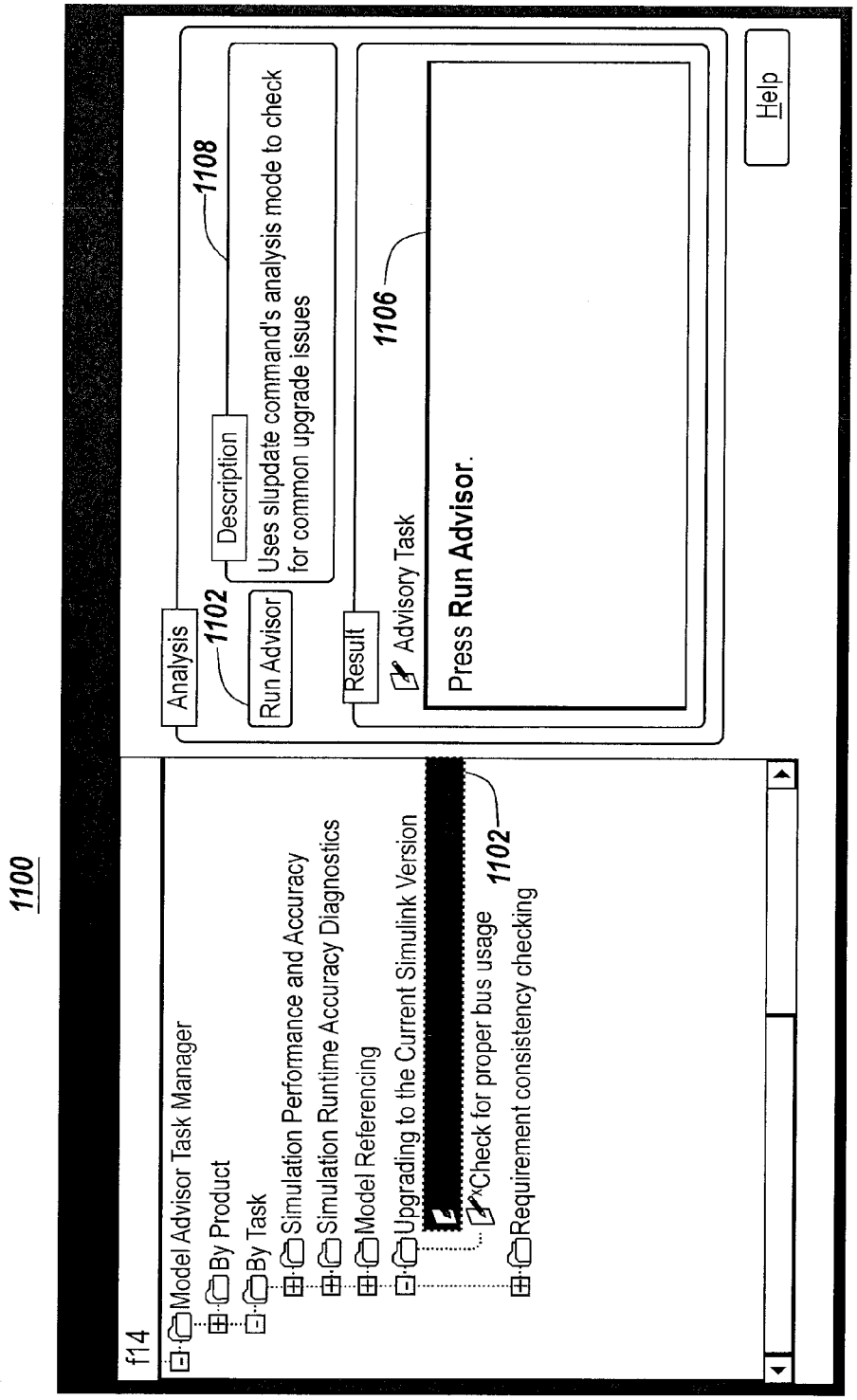
FIG. 11A illustrates an exemplary graphical user interface that may be used to find issues in an executable block diagram model.

FIG. 11A illustrates an exemplary graphical user interface that may be used to find upgrade issues in an executable block diagram model. Graphical user interface 1100 is provided to let a user select different kinds of checks that may be run against a model. Graphical user interface 1100 includes an upgrade check 1102 that checks for common update issues. A button 1104 is provided to start a check that is selected in graphical user interface 1100. Label 1108 provides a description of the upgrade check 1102. Results of a check are displayed in text field 1106.

Figure 11B:
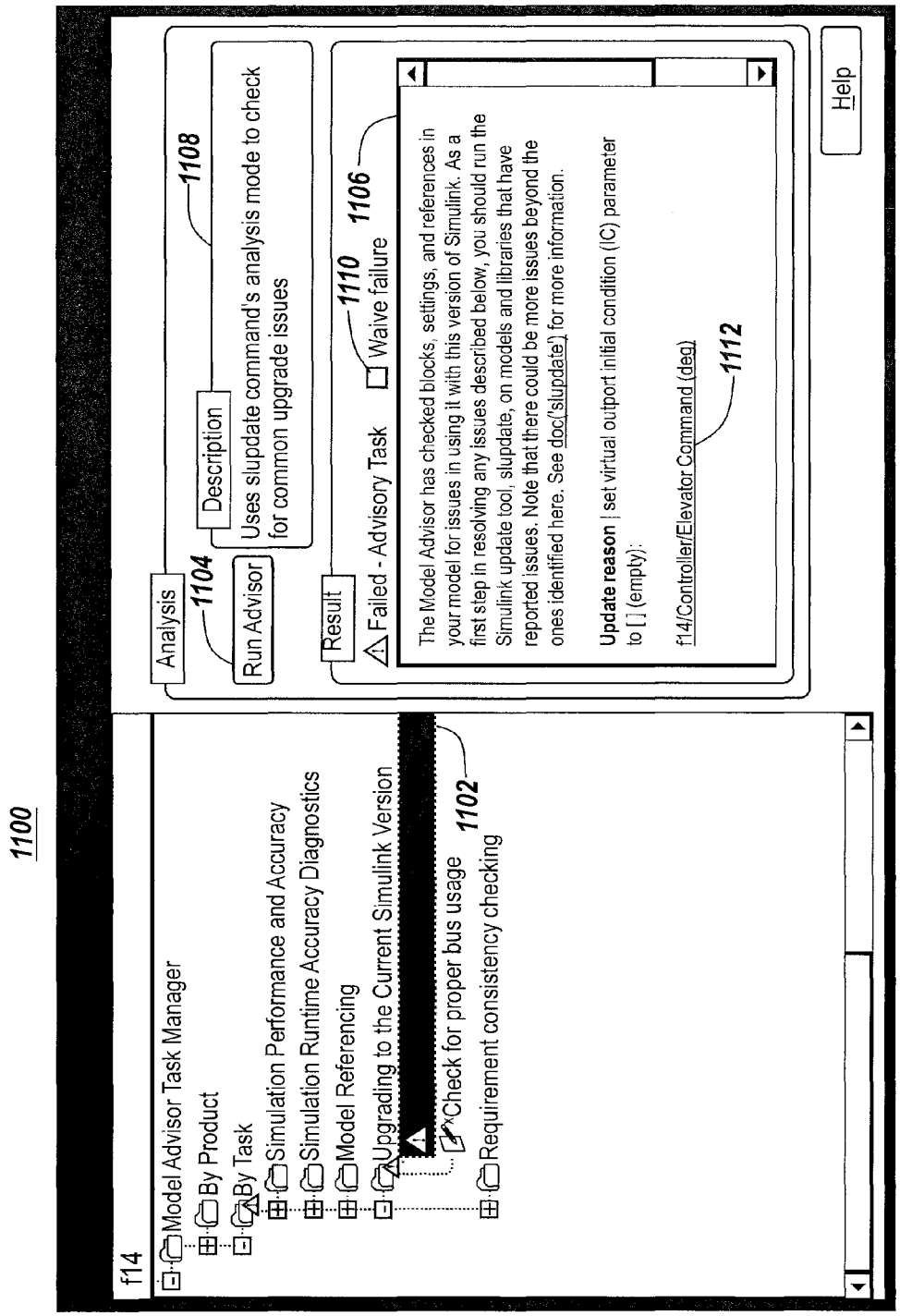
FIG. 11B illustrates an exemplary issue that may be displayed in the exemplary graphical user interface.

FIG. 11B illustrates exemplary results of running the check 1102 illustrated in FIG. 11A. Text field 1106 may display recommended changes to the model to fix any problem. In another embodiment, text field 1106 may also display recommended steps that a user should follow to find all the possible problems in the model. Graphical user interface 1100 may display a check box 1110 for allowing a user to ignore failure that was found after running a check. Text field 1106 may include a hyperlink 1112 that provides a link to the part of the model that is identified as problematic. By selecting hyperlink 1112 with a pointing device, a model and a level of detail of the problematic block diagram modeling component may be displayed, such as shown in FIG. 11C.

Figure 11C:
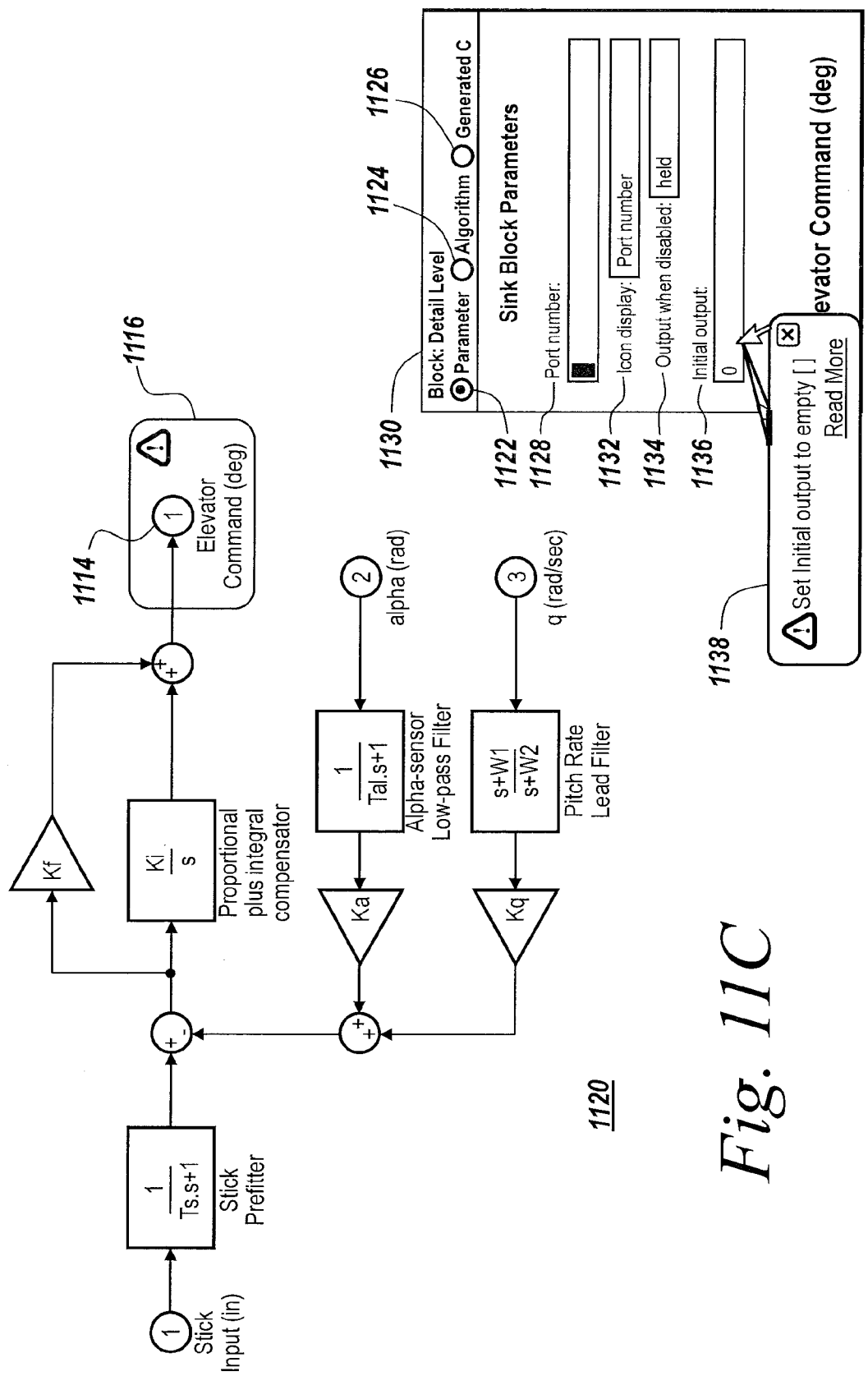
FIG. 11C illustrates how a level of detail may be displayed to show the exemplary issue in the executable block diagram model.

FIG. 11C illustrates how a level of detail may be displayed to show an exemplary issue that can be present in the executable block diagram model. FIG. 11C shows a model 1120 and a viewer widget 1130 that displays a level of detail of block diagram modeling component 1114. Block diagram modeling component 1114 is highlighted by box 1116 in the model 1120 so that a user can easily identify the location of the issue identified by running check 1102 in FIG. 11B. Viewer widget 1130 displays a radio button 1122 for selecting a parameter level of detail, a radio button 1124 for selecting an algorithm level of detail, and a radio button 1126 for selecting a generated code level of detail.

In FIG. 11C, radio button 1122 for selecting a parameter level of detail is selected and various parameters and their corresponding values are displayed in viewer widget 1130. Viewer widget 1130 displays port number parameter 1128, icon display parameter 1132, output when disabled parameter 1134, and initial output parameter 1136. A warning pop-up 1138 is displayed to show that the value of initial output parameter 1136 should be set to empty. The message shown in the warning pop-up 1138 is consistent, but may differ, with the message shown in text field 1106 of graphical user interface 1100 in FIG. 11B.

In one embodiment, when hyperlink 1112 is selected by a user using a pointing device, viewer widget 1130 is automatically displayed in the model window to show a user which parameter is causing a check to fail. More than one parameter may cause a check to fail and that data other than parameters, such as unconnected block inputs or outputs, improper block usage, mismatch of port and signal names, crossing transitions in a state transition diagram, multiple writes to a data store, automatic insertion of rate transitions, wrong uses of a mux block for creating buses, may also cause a check to fail.

Figure 12:
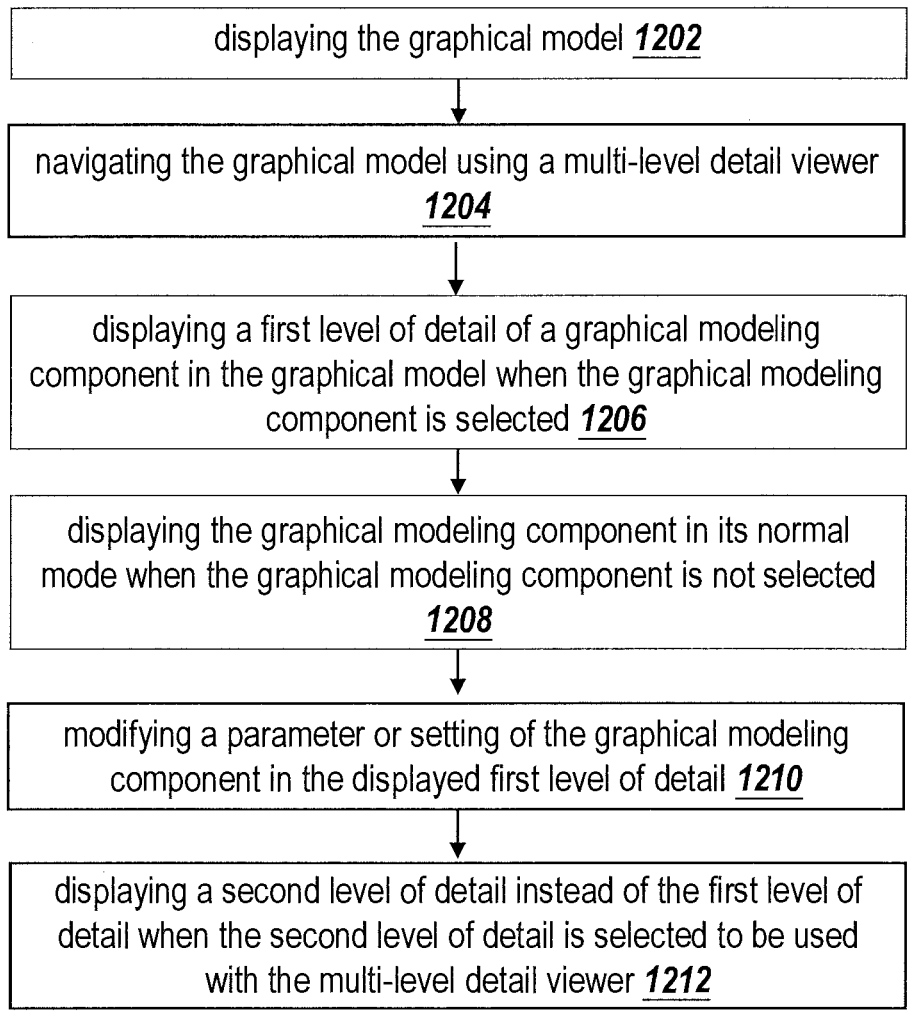
FIG. 12 illustrates a flow chart depicting exemplary processing that allows use a multi-level detail viewer to be used in one exemplary embodiment.

FIG. 12 illustrates a flow chart depicting exemplary steps taken to use a multi-level detail viewer in one exemplary embodiment. In step 1202, an executable block diagram model 800 is displayed. In step 1204, the executable block diagram model 800 may be navigated using a multi-level detail viewer. In step 1206, a first level of detail of a block diagram modeling component 804 in the executable block diagram model may be displayed when the block diagram modeling component 804 is selected using a cursor 802 or one or more keystrokes. In step 1208, the block diagram modeling component 804 may be displayed in its normal mode when the block diagram modeling component 804 is not selected. In step 1210, a parameter or setting of the block diagram modeling component 804 may be modified in the displayed first level of detail. In step 1212, a second level of detail may be displayed instead of the first level of detail when the second level of detail is selected to be used with the multi-level detail viewer.

Exemplary embodiments described herein may be implemented in a technical computing environment (TCE). A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language such as C++, C, Fortran, Pascal, etc.

In one implementation, a TCE may include a dynamically typed language that can be used to express problems and/or solutions in mathematical notations familiar to those of skill in the relevant arts. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and design, state based analysis and design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, distributed processing, etc.). In another implementation, a TCE may provide these functions as block sets. In still another implementation, a TCE may provide these functions in another way, such as via a library, etc., a TCE may be implemented as a text based environment, a graphically based environment, or another type of environment, such as a hybrid environment that is both text and graphically based.

A TCE may be implemented in a number of forms, such as a text-based form, a graphically-based form, etc. For example, a TCE may be implemented using one or more graphically-based products. For example, a graphically-based TCE, may be implemented using products such as, but not limited to, Simulink®, Stateflow®, SimEvents™, etc., by The MathWorks, Inc.; VisSim by Visual Solutions; LabView® by National Instruments; Dymola by Dynasim; Extend from Imagine That Inc.; SoftWIRE by Measurement Computing; WiT by DALSA Coreco; VEE Pro or SystemVue by Agilent; SystemVIEW from Elanix, Vision Program Manager from PPT Vision, Khoros from Khoral Research, Gedae by Gedae, Inc.; Scicos from (INRIA); Virtuoso from Cadence, Rational Rose from IBM, Rhopsody or Tau from Telelogic; or aspects of a Unified Modeling Language (UML) or SysML environment. The graphically-based TCE may support code generation, constraints generation, constraints checking, etc.

A TCE may further be implemented as a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards to monitor performance of generated code, etc.).

In an alternative embodiment, aspects of the invention may be implemented in a language that is compatible with a product that includes a TCE, such as one or more of the above identified text-based or graphically-based TCE's. For example, SIMULINK (a graphically-based TCE) may be used to practice exemplary embodiments described herein. A SIMULINK-compatible modeling environment provides means (e.g., via hardware or software based logic) to use a SIMULINK model and/or features in the SIMULINK-compatible modeling environment. For example, a SIMULINK-compatible modeling environment may provide hardware and/or software based logic to interface with a SIMULINK model, to import or export a SIMULINK model, to translate a SIMULINK model, to integrate a SIMULINK model, etc. Although exemplary embodiments may be described relative to a SIMULINK-compatible modeling environment, the present invention is not limited to these embodiments and may be applied to block diagram modeling and/or computing tasks via other block diagram modeling environments.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A non-transitory computer-readable medium storing instructions, the instructions including:
   one or more instructions that, when executed by a processor, cause the processor to:
      provide, for display, a status bar in a bottom portion of a window of a display area;
      provide, for display, an executable block diagram model in another portion of the window,
         the executable block diagram model representing a dynamic system,
         the executable block diagram model including modeling components that are interconnected with lines,
         the lines representing signals,
         the modeling components being associated with one or more attributes, and
         the one or more attributes being associated with one or more attribute values;
      provide, for display, a search tool, for searching an executable graphical model, in the status bar of the bottom portion of the window based on providing, for display, the executable block diagram model for display in the other portion of the window;
      receive a search string via a search field of the search tool;
      identify an attribute value, of the one or more attribute values, that is relevant to the search string;
      identify a modeling component, of the modeling components, that is associated with the attribute value relevant to the search string; and
      provide, based on identifying the modeling component, a search result for the search string in the status bar of the bottom portion of the window.

2. The non-transitory computer-readable medium of claim 1, where the instructions further include:
   one or more instructions that, when executed by the processor, cause the processor to:
      provide, for display, the modeling component in the display area while providing the search tool for display.

3. The non-transitory computer-readable medium of claim 1, where the instructions further include:
   one or more instructions that, when executed by the processor, cause the processor to:
      highlight the modeling component in the other portion of the display area that is being used to display the executable block diagram model.

4. The non-transitory computer-readable medium of claim 1,
   where the instructions further include:
      one or more instructions that, when executed by the processor, cause the processor to:
         receive a selection of a search category via a category field of the search tool,
      where the search category includes one of a configuration preference, a block name, or a parameter, and
      where the one or more instructions to identify the attribute value include:
         one or more instructions that, when executed by the processor, cause the processor to:
            identify the attribute value that is relevant to the received search string based on the search category.

5. The non-transitory computer-readable medium of claim 1, where the instructions further include:
   one or more instructions that, when executed by the processor, cause the processor to:
      provide, for display and based on identifying the modeling component, a shape that surrounds the modeling component to provide the search result by highlighting the modeling component.

6. A method comprising:
   providing, by a computing device and for display, a status bar in a bottom portion of a window of a display area;
   providing, by the computing device and for display, an executable block diagram model in another portion of the window,
      the executable block diagram model representing a dynamic system,
      the executable block diagram model including modeling components and lines,
      the lines representing signals in the executable block diagram model,
      the modeling components being associated with one or more attributes, and
      the one or more attributes being associated with one or more attribute values;
   providing, by the computing device and for display, a search tool in the status bar of the bottom portion of the window based on providing the executable block diagram model for display in the other portion of the window;
   receiving, by the computing device, a search string via a search field of the search tool; identifying, by the computing device and using the search string, an attribute value from among the one or more attributes;
   identifying, by the computing device, a modeling component, from among the modeling components, that is associated with the attribute value; and
   providing, by the computing device and based on identifying the modeling component, a search result for the search string by highlighting the modeling component.

7. The method of claim 6, further comprising:
   displaying the modeling component in the display area while displaying the search tool.

8. The method of claim 6, where providing the search result for the search string by highlighting the modeling component includes:
   highlighting the modeling component in the other portion of the display area that is being used to display the executable block diagram model.

9. The method of claim 6,
   where the search tool comprises:
      a category field for receiving a search category, and
      the search field for receiving the search string, and where the search category includes one or more of a configuration preference, a block name, or a parameter.

10. The method of claim 6, where providing the search result for the search string further comprises:
providing, for display, an identifier associated with the modeling component.

11. A system comprising:
one or more processors to:
provide a status bar for display in a bottom portion of a window of a display area;
provide an executable block diagram model for display in another portion of the window,
the executable block diagram model representing a dynamic system,
the executable block diagram model including modeling components,
the modeling components including a plurality of executable blocks that are interconnected with lines,
the lines representing signals in the executable block diagram model,
the modeling components being associated with one or more attributes, and
the one or more attributes being associated with one or more attribute values;
provide a search tool for display in the status bar of the bottom portion of the window based on the executable block diagram model being displayed in the other portion of the window;
receive the search string via a search field of the search tool;
determine an attribute value, from among the one or more attribute values, that is relevant to the search string;
identify a modeling component, from among the modeling components, that is associated with the attribute value relevant to the search string; and
provide, based on identifying the modeling component, a search result for the search string in the status bar of the bottom portion of the window or by highlighting the modeling component in the other portion of the window.

12. The system of claim 11,
where the one or more processors are further to:
receive input specifying a search category via the search tool, and
where, when determining that the attribute value is relevant to the search string, the one or more processors are to:
determine the attribute value that is relevant to the search string based on the input specifying the search category.

13. The system of claim 11, where the one or more processors are further to:
identify a selection of a particular button; and
provide, based on the selection of the particular button, another search result for the search string by highlighting another modeling component of the modeling components.

14. The system of claim 11, where, when providing the search result for the search string by highlighting the modeling component, the one or more processors are to:
provide, for display, a shape that surrounds the modeling component.

15. The system of claim 11, where the one or more processors are further to:
provide, for display, a text field associated with the attribute value;
receive, via the text field, a modification to the attribute value; and
modify the attribute value based on the modification.

16. A method comprising:
providing, by a device and for display, a status bar in a bottom portion of a window of a display area;
providing, by the device and for display, an executable block diagram model in another portion of the window;
providing, by the device and for display, a search tool in the status bar of the bottom portion of the window based on providing, for display, the executable block diagram model in the other portion of the window;
receiving, by the device, a value input via a particular field of the search tool;
identifying, by the device, an attribute value, of attribute values associated with modeling components of the executable block diagram model, based on the value input;
identifying, by the device, a modeling component, of the modeling components, that is associated with the attribute value; and
providing, by the device and based on identifying the modeling component, a search result for the value input.

17. The method of claim 16,
where the search tool comprises a category option field and the particular field,
where the method further comprises:
receiving another input specifying a search category via the category option field, and
where identifying the attribute value comprises:
identifying the attribute value, of the attribute values, based on the value input and the other input specifying the search category.

18. The method of claim 16, further comprising:
providing, for display in the other portion of the display area, a text field associated with the attribute value;
receiving, via the text field, a modification to the attribute value; and
modifying the attribute value based on the modification.

19. A system comprising:
one or more processors to:
provide, for display, a status bar in a bottom portion of a window of a display area;
provide, for display, an executable block diagram model in another portion of the window,
the executable block diagram representing a dynamic system,
the executable block diagram including modeling components, and
the modeling components being associated with attribute values;
provide, for display, a search tool in the status bar of the bottom portion of the window based on providing, for display, the executable block diagram model in the other portion of the window,
the search tool including:
a search category option, and
a text field;
receive, via the search category option of the search tool, a first input that specifies a particular search category;
receive, via the text field of the search tool, a second input that specifies a particular value associated with the particular search category;
identify an attribute value, of the attribute values, based on the first input and the second input;

identify a modeling component, of the modeling components, that is associated with the attribute value; and provide, based on identifying the modeling component, a search result by highlighting the modeling component in the executable block diagram model.

20. The system of claim 19, where, when providing the search result by highlighting the modeling component, the one or more processors are further to:

cause a shape to surround the modeling component in the executable block diagram model.

21. The system of claim 19, where the one or more processors are further to:

identify one or more other modeling components, of the modeling components, based on the first input and the second input; and provide, for display in the display area, a list of search results, the list of search results including:

an identifier of the modeling component, and one or more other identifiers of the one or more other modeling components.

22. The system of claim 19, where the first input includes information specifying configuration preferences, block names, or parameters as the particular search category.

23. The system of claim 19, where the one or more processors are further to:

detect a particular cursor being within a particular region associated with the modeling component; and provide, for display, a particular level of detail of the modeling component based on the particular cursor being within the particular region associated with the modeling component.

* * * * *